US009480202B2

(12) United States Patent
Pitzer

(10) Patent No.: US 9,480,202 B2
(45) Date of Patent: Nov. 1, 2016

(54) AUTOMATED SELECTIVE HARVESTING OF CROPS

(71) Applicant: Harvest CROO, LLC, Plant City, FL (US)

(72) Inventor: Robert Pitzer, Tampa, FL (US)

(73) Assignee: Harvest CROO, LLC, Plant City, FL (US)

( * ) Notice: Subject to any disclaimer, the term of this patent is extended or adjusted under 35 U.S.C. 154(b) by 2 days.

(21) Appl. No.: 14/576,598

(22) Filed: Dec. 19, 2014

(65) Prior Publication Data

US 2015/0173297 A1    Jun. 25, 2015

Related U.S. Application Data

(60) Provisional application No. 61/919,168, filed on Dec. 20, 2013.

(51) Int. Cl.
*A01D 45/00* (2006.01)
*A01D 46/30* (2006.01)

(52) U.S. Cl.
CPC ............ *A01D 46/30* (2013.01); *A01D 45/006* (2013.01)

(58) Field of Classification Search
CPC .... A01D 45/00; A01D 45/007; A01D 46/00; A01D 46/247; A01D 45/006; A01D 46/30; Y10S 56/08
USPC .......... 56/1, 327.1, 327.2; 171/8, 39, 47, 56; 294/111
See application file for complete search history.

(56) References Cited

U.S. PATENT DOCUMENTS 3,460,332 A    8/1969 Bucheke et al.
3,552,108 A    1/1971 Kattan et al.
3,596,456 A    8/1971 Quick
3,698,171 A    10/1972 Hecht
4,003,193 A *  1/1977 Haws ................... A01D 45/007
                                          56/327.2
4,034,542 A *  7/1977 Loehr .................. A01D 46/247
                                          294/111

(Continued)

FOREIGN PATENT DOCUMENTS

JP    2008023746 A    1/1996
JP    2009145367 A    6/1997

(Continued)

OTHER PUBLICATIONS

International Search Report and Written Opinion for PCT/US2014/071411 dated Apr. 16, 2015.

(Continued)

*Primary Examiner* — Robert Pezzuto
(74) *Attorney, Agent, or Firm* — Bryan Cave LLP

(57) ABSTRACT

Various embodiments include a device for selectively harvesting crops on a plant. The device can include a picking apparatus. The picking apparatus can be rotatable around a central axis. The picking apparatus can include a plurality of grippers each spaced apart and extending radially from the central axis, and each configured to pick a different individual one of the crops. Each of the plurality of grippers can be adjustable between an open position and a closed position. Each of the plurality of grippers can be configured in the open position to open around the individual crop. Each of the plurality of grippers can be configured in the closed position to securely hold the individual crop when the picking apparatus is rotated around the central axis. Other embodiments are provided.

25 Claims, 19 Drawing Sheets

(56) References Cited

U.S. PATENT DOCUMENTS

| | | | | |
|---|---|---|---|---|
| 4,064,682 | A | * | 12/1977 | Haws .................. A01D 45/007 56/327.2 |
| 4,291,525 | A | * | 9/1981 | Benkert ................ A01D 45/00 171/56 |
| 4,532,757 | A | | 8/1985 | Tutle |
| 4,843,561 | A | | 6/1989 | Larson |
| 5,024,052 | A | | 6/1991 | Bragg et al. |
| 6,105,352 | A | | 8/2000 | Tremblay et al. |
| 6,338,236 | B1 | | 1/2002 | Rodriguez |
| 8,306,663 | B2 | | 11/2012 | Wickham |
| 8,336,893 | B2 | | 12/2012 | Grossberger |
| 2006/0150602 | A1 | | 7/2006 | Stimmann |
| 2010/0050588 | A1 | | 3/2010 | Ramirez |
| 2011/0252760 | A1 | | 10/2011 | Bravo Trinidad et al. |

FOREIGN PATENT DOCUMENTS

| | | |
|---|---|---|
| JP | 02757480 | 5/1998 |
| JP | 2001095348 | 10/2001 |
| JP | 2011206014 | 10/2011 |
| JP | 2012148380 | 8/2012 |
| WO | 2010063075 | 6/2010 |

OTHER PUBLICATIONS

The Japan Times; "Latest robot can pick strawberry fields forever"; http://www.japantimes.co.jp/news/2013/09/26/business/latest-robot-can-pick-strawberry-fields-forever/#.Vln_X9LF-iA; Sep. 26, 2013.
National Physical Laboratory (UK); "Robot strawberry pickers"; http://www.npl.co.uk/news/robot-strawberry-pickers; Aug. 7, 2013.
ASME; "Smart Robots for Picking Fruit"; https://www.asme.org/engineering-topics/articles/robotics/smart-robots-for-picking-fruit; May 2013, May 1, 2013.
US Department of Agriculture: National Institute of Food and Agriculture; "USDA Grants Support Federal Partnership for Robotics Research"; http://www.csrees.usda.gov/newsroom/news/2013news/10251_robots.html; Oct. 25, 2013, Oct. 29, 2013.
CNS News; "Gov't Pays $1,123,463 to Develop Strawberry Harvest-Aiding Robots"; http://cnsnews.com/article/eric-schneider/govt-pays-1123463-develop-strawberry-harvest-aiding-robots; Nov. 8, 2013.
Singularity Hub; "Japan's Robot Picks Only the Ripest Strawberries"; https://singularityhub.com/2010/12/04/japans-robot-picks-only-the-ripest-strawberries; Dec. 4, 2010.
CNET; "Strawberry-picking robot knows when they're ripe"; https://www.cnet.com/news/strawberry-picking-robot-knows-when-theyre-ripe/; Dec. 13, 2010.
CNET; "$50,000 strawberry picking robot to go on sale in Japan"; http://cnet.com/news/50000-strawberry-picking-robot-to-go-on-sale-in-japan/; Sep. 27, 2013.
TechCrunch; "Video: Impressive Strawberry Picking Robot"; http://techcrunch.com/2010/12/01/video-impressive-strawberry-picking-robot/; Dec. 1, 2010.
Wired; "Robot Learns to Pick the Sweetest, Ripest Strawberries"; http://www.wired.com/2012/08/st_strawberry_robot/; Aug. 6, 2012.
Agrobot; "Strawbery Harvesters"; http://www.agrobot.com/products.html; Jan. 16, 2015.
Robotic Harvesting, LLC; "Products: Robotic Strawberry Harvester"; http://roboticharvesting.com/products.html; Jan. 16, 2015.
The Packer; "Robotic harvesters may be the future"; http://www.thepacker.com/fruit-vegetable-news/shipping-profiles/Robotic-harvesters-may-be-the-futur-256744101.html?print=1; Apr. 25, 2014.
CropCare; "PA 1400 Picking Assistant"; http://www.cropcareequipment.com/vegetable_equip/picking_assistant.php; Jan. 16, 2015.
International Search Report and Written Opinion from PCT/US2016/018099, dated May 12, 2016.

* cited by examiner

AUTOMATED SELECTIVE HARVESTING OF CROPS

CROSS-REFERENCE TO RELATED APPLICATIONS

This application claims the benefit of U.S. Provisional Application No. 61/919,168, filed Dec. 20, 2013. U.S. Provisional Application No. 61/919,168 is incorporated herein by reference in its entirety.

TECHNICAL FIELD

This disclosure relates generally to crop harvesting, and relates more particularly to automated systems for selectively picking crops from plants.

BACKGROUND

Various crops, such as strawberries, have been harvested typically using manual labor due to the delicate nature of the crops and the selective nature of the harvesting. For example, laborers perform the harvesting by selectively picking ripe crops from the plants while leaving unripe crops on the plants for later harvesting when they have ripened. The high seasonal demand for laborers and the limited labor force has resulted in increased labor costs and crops being left unpicked. Further, labor shortages have resulted in portions of fields being left unplanted in order to avoid the effort, expense, and waste involved with growing unpicked crops.

BRIEF DESCRIPTION OF THE DRAWINGS

To facilitate further description of the embodiments, the following drawings are provided in which.

Figure 1:
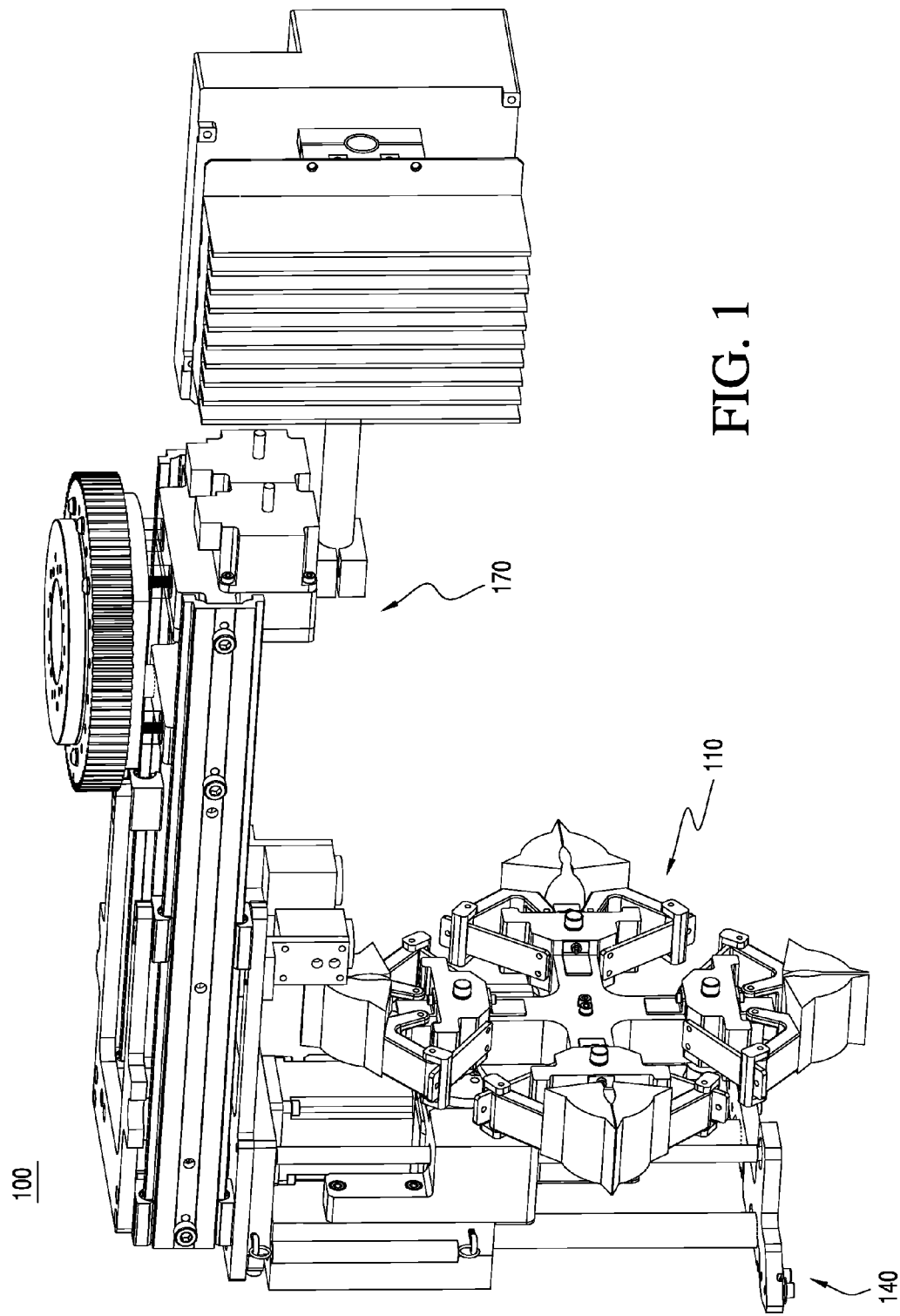
FIG. 1 illustrates a top, front, left side perspective view of a harvesting robot, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a device for selectively harvesting crops on a plant. The device can include a picking apparatus. The picking apparatus can be rotatable around a central axis. The picking apparatus can include a plurality of grippers each spaced apart and extending radially from the central axis, and each configured to pick a different individual one of the crops. Each of the plurality of grippers can be adjustable between an open position and a closed position. Each of the plurality of grippers can be configured in the open position to open around the individual crop. Each of the plurality of grippers can be configured in the closed position to securely hold the individual crop when the picking apparatus is rotated around the central axis.

A number of embodiments include a method of providing a device for selectively harvesting crops on a plant. The method can include providing a picking apparatus. The picking apparatus can be rotatable around a central axis. The picking apparatus can include a plurality of grippers each spaced apart and extending radially from the central axis, and each configured to pick a different individual one of the crops. The method also can include providing a carriage assembly. The carriage assembly can include a first rotational mechanism. The picking apparatus can be configured to be coupled to the first rotational mechanism. The first rotational mechanism can be configured to rotate the picking apparatus around the central axis in a rotational path with respect to the carriage assembly. Each of the plurality of grippers can be adjustable between an open position and a closed position. Each of the plurality of grippers can be configured in the open position to open around the individual crop. Each of the plurality of grippers can be configured in the closed position to securely hold the individual crop when the picking apparatus is rotated around the central axis.

Some embodiments include a foliage displacement mechanism for facilitating harvesting crops on a plant. The foliage displacement mechanism can include a back surface configured to extend normal to a growing bed of the plant. The foliage displacement mechanism also can include a base configured to extend parallel to the growing bed from the back surface toward the plant. The foliage displacement mechanism further can include a curved surface extending from the base upward to the back surface. The foliage displacement mechanism also can include a channel bisecting a front portion of the base and extending upward through the curved surface, the channel being configured to surround a center of the plant when the foliage displacement mechanism is moved toward the plant. The foliage displacement mechanism can be configured, when moved toward the plant, to move the foliage upward and toward the center of the plant to expose at least a portion of the crops.

Figure 2:
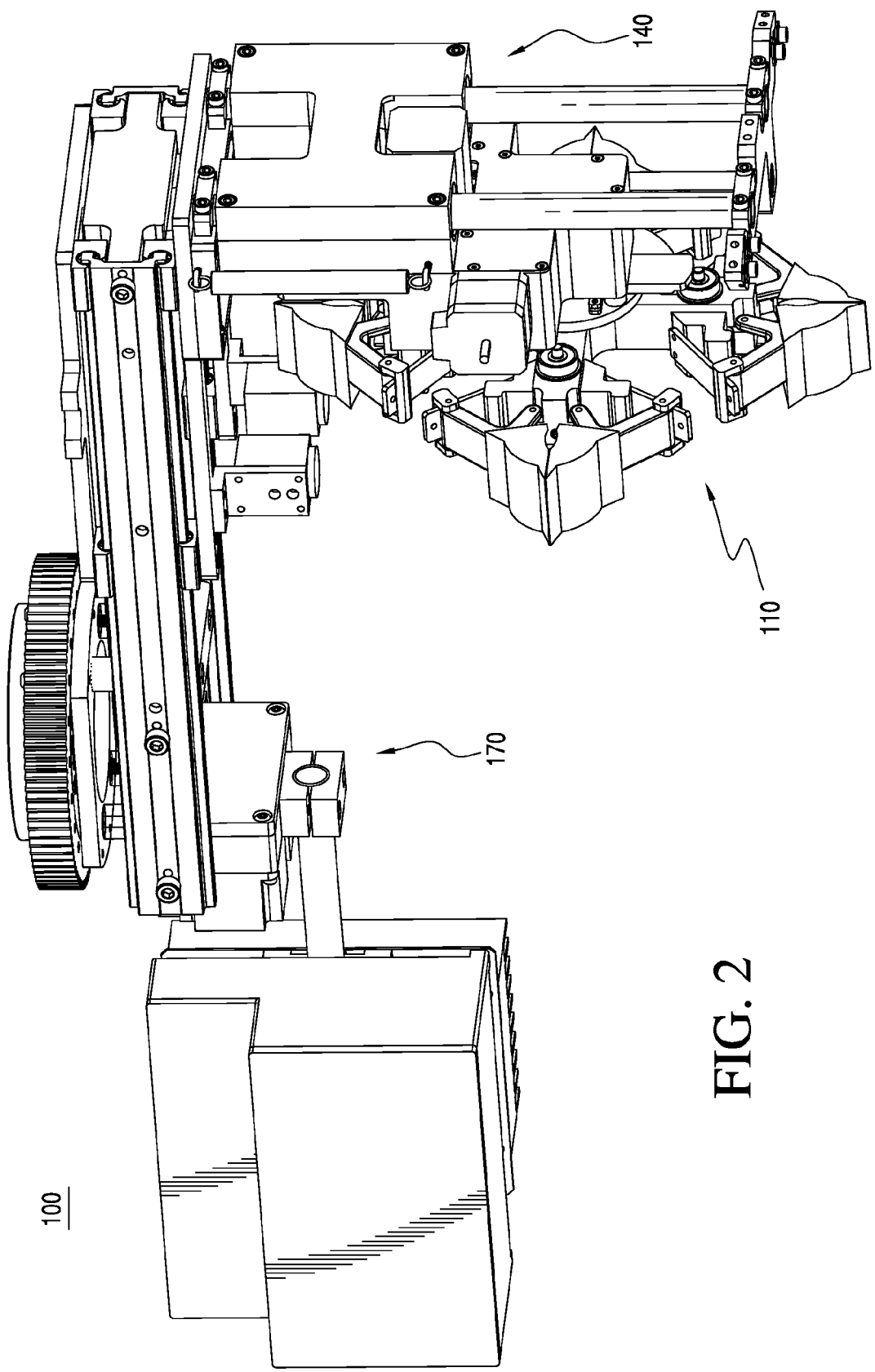
FIG. 2 illustrates a bottom, back, right side perspective view of the harvesting robot of FIG. 1.

Turning to the drawings, FIG. 1 illustrates a top, front, left side perspective view of a harvesting robot 100. FIG. 2 illustrates a bottom, back, right side perspective view of harvesting robot 100. Harvesting robot 100 is merely exemplary, and embodiments of the harvesting robot are not limited to embodiments presented herein. The harvesting robot can be employed in many different embodiments or examples not specifically depicted or described herein. In many embodiments, harvesting robot 100 can include a picking apparatus 110, a carriage assembly 140, and/or a carrier assembly 170. In several embodiments, harvesting robot 100 can be configured to harvest crops from plants. In some embodiments, harvesting robot 100 can be used to harvest crops such as strawberries from strawberry plants. In the same or other embodiments, harvesting robot 100 can be used to harvest crops such as tomatoes, peppers (e.g., bell peppers, chili peppers, etc.), oranges, and/or other suitable crops. In a number of embodiments, harvesting robot 100 can be configured to selectively pick crops (e.g., ripe crops) from plants, and leave other crops (e.g., unripe crops) on the plants.

Figure 3:
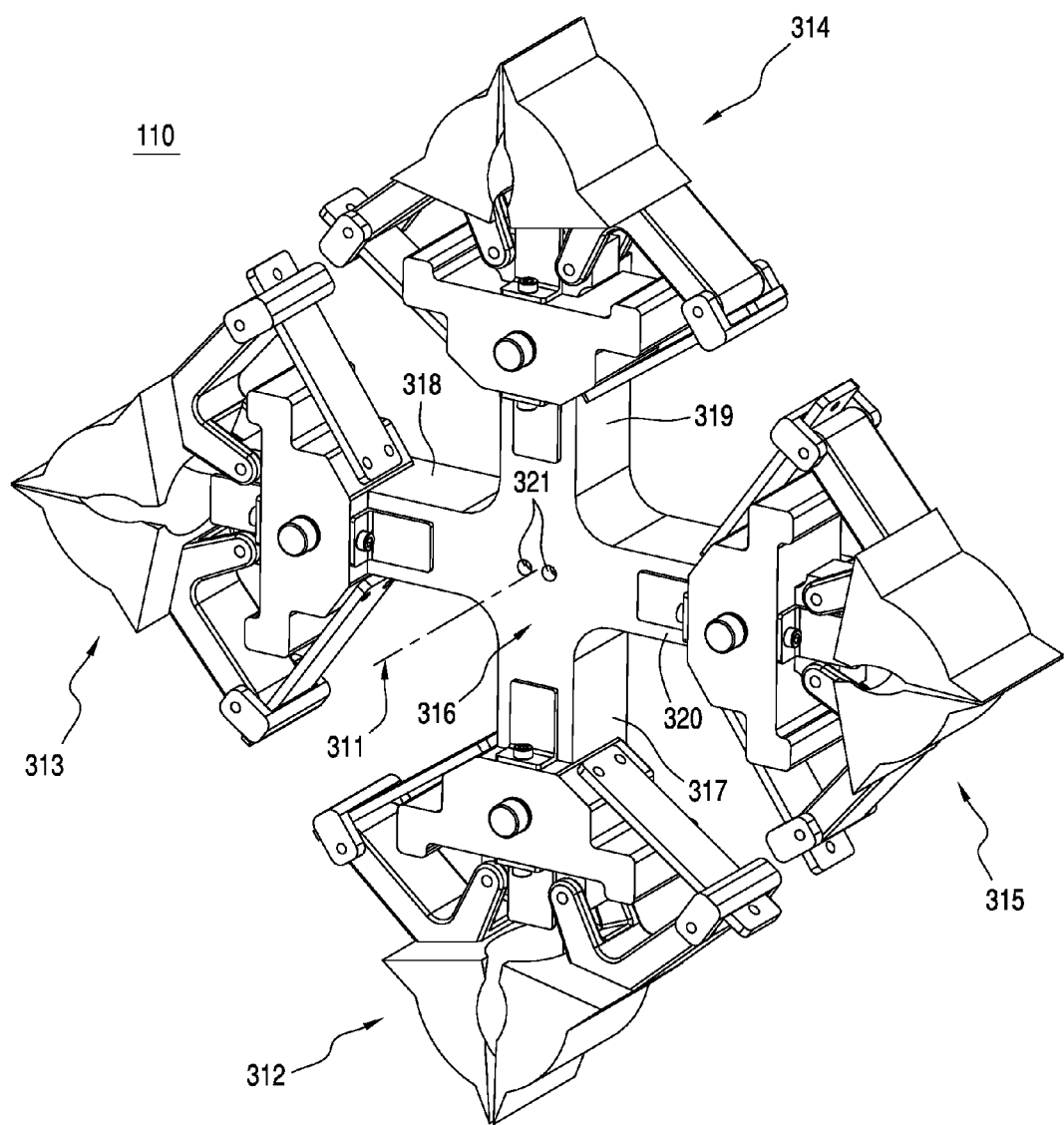
FIG. 3 illustrates a top, front, right side perspective view of a picking apparatus, according to the embodiment of FIG. 1.

Turning ahead in the drawings, FIG. 3 illustrates a top, front, right side perspective view of picking apparatus 110. Picking apparatus 110 is merely exemplary, and embodiments of the picking apparatus are not limited to embodiments presented herein. The picking apparatus can be employed in many different embodiments or examples not specifically depicted or described herein. In many embodiments, picking apparatus 110 can be rotatable around a central axis 311. In a number of embodiments, picking apparatus 110 can include one or more grippers, such as grippers 312, 313, 314, and/or 315. In various embodiments, each of the grippers (e.g., 312-315) can be used to pick a different individual one of the crops. For example, gripper 312 can be used to pick a first strawberry; gripper 313 can be used to pick a second strawberry; gripper 314 can be used to pick a third strawberry; and/or gripper 315 can be used to pick a fourth strawberry. In a number of embodiments, picking apparatus 110 can include four grippers (e.g., 312-315), such as shown in FIG. 3. In other embodiments, the number of grippers (e.g., 312-315) on picking apparatus 110 can be one, two, three, five, six, seven, eight, nine, ten, or another suitable number of grippers. In some embodiments, the number of grippers can be even numbered. In other embodiments, the number of grippers can be odd numbered. In several embodiments, the number of grippers (e.g., 312-315) on picking apparatus 110 can be based on the average number of individual crops (e.g., strawberries, etc.) expected to be harvested from a plant, the time it takes to offload the individual crops from the grippers (e.g., 312-315), a compromise (such as an optimal compromise) between the maximum number of individual crops expected to be harvested and the time it takes to offload the individual crops, and/or other suitable factors. Each gripper can be identical to the other grippers in picking apparatus 110.

In a number of embodiments, the grippers (e.g., 312-315) can be spaced apart and/or can extend radially from central axis 311. In many embodiments, the grippers (e.g., 312-315) can be facing radially outwards from a rotational circumference of picking apparatus 110. In some embodiments, the gripper can be equally spaced apart on picking apparatus 110. In several embodiments, picking apparatus 110 can include a frame 316, which can include one or more spokes, such as spokes 317, 318, 319, and/or 320. In various embodiments, each gripper (e.g., 312-315) can be attached to a different spoke (e.g., 317-320). For example, as shown in FIG. 3, gripper 312 can be attached to spoke 317; gripper 313 can be attached to spoke 318; gripper 314 can be attached to spoke 319; and/or gripper 315 can be attached to spoke 320. In other embodiments, frame 316 can be a solid wheel with or without spokes, and the grippers (e.g., 312-315) can be attached to the solid wheel of frame 316. In various embodiments, frame 316 can include an attachment mechanism, such as attachment mechanism 321. In many embodiments, attachment mechanism 321 can be used to rotate picking apparatus 110 around central axis 311.

Figure 4:
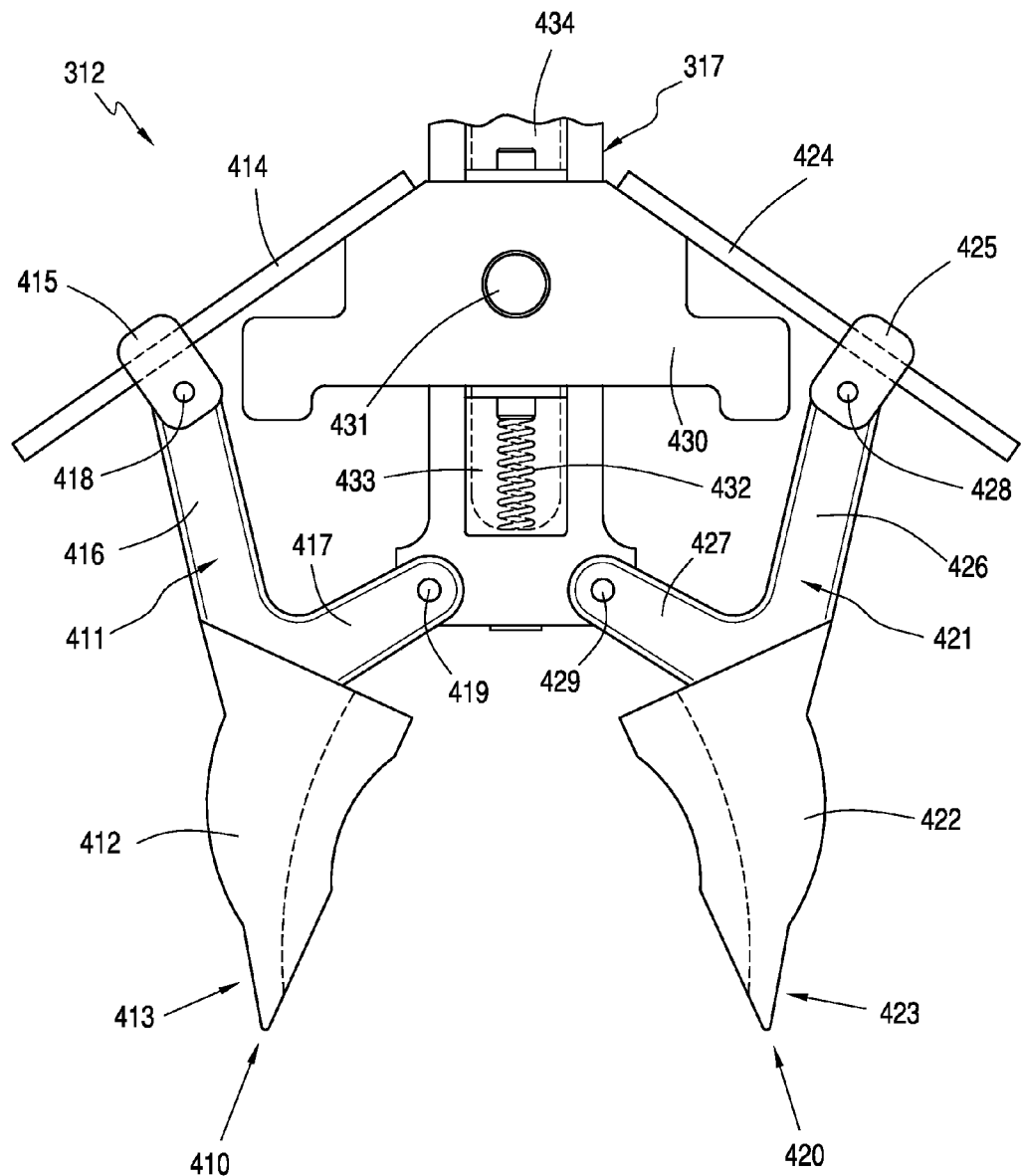
FIG. 4 illustrates a front view of a gripper of the picking apparatus of FIG. 3 in an open position.
Figure 5:
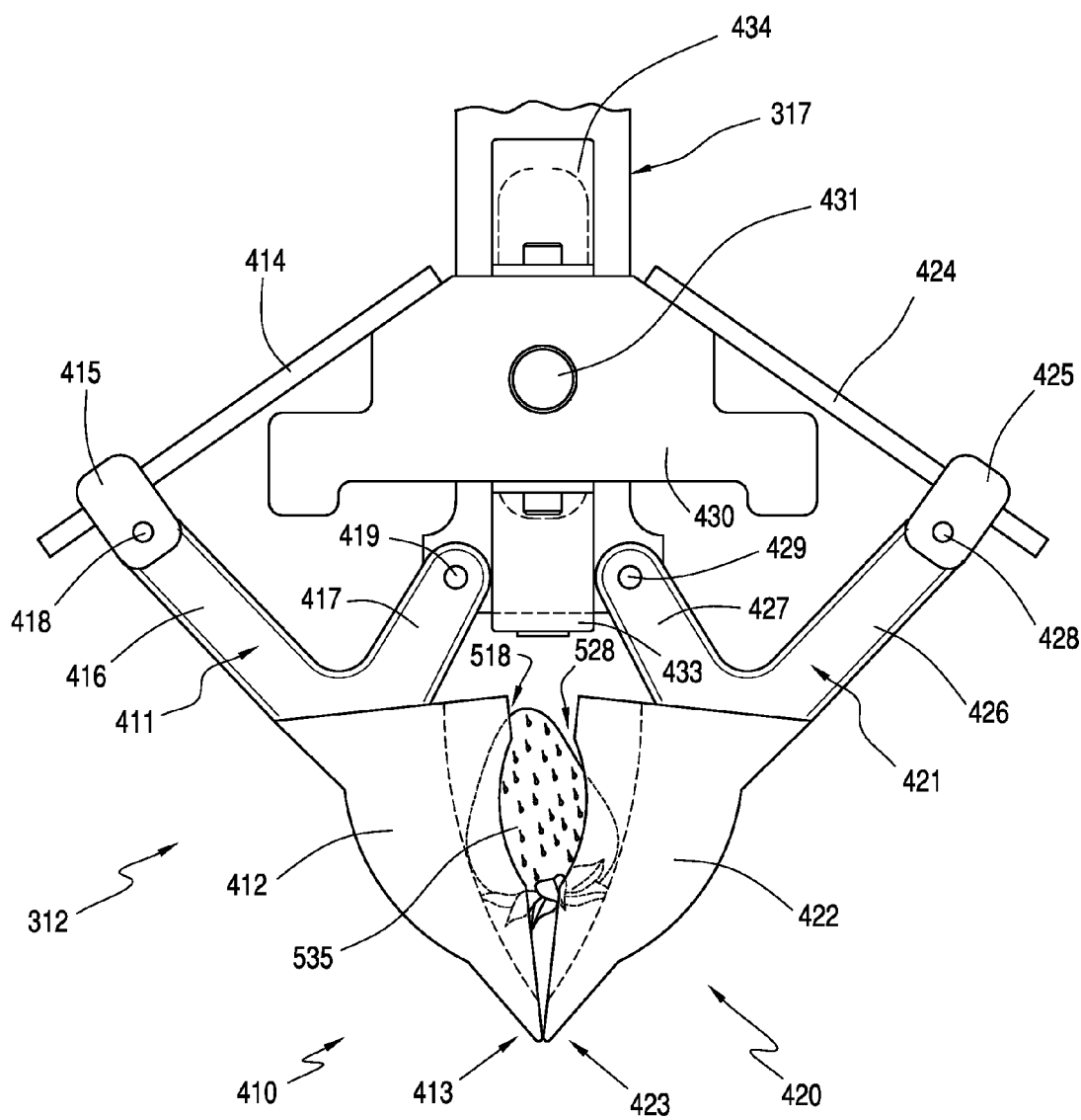
FIG. 5 illustrates a front view of the gripper of FIG. 4 in a closed position.

Turning ahead in the drawings, FIG. 4 illustrates a front view of gripper 312 in an open position. FIG. 5 illustrates a front view of gripper 312 in a closed position. Gripper 312 is merely exemplary, and embodiments of the gripper are not limited to embodiments presented herein. The gripper can be employed in many different embodiments or examples not specifically depicted or described herein. In many embodiments, each of the other grippers (e.g., 313-315 (FIG. 3)) on picking apparatus 110 (FIGS. 3) can be identical or similar to gripper 312. In several embodiments, gripper 312 can be adjustable between the open position, as shown in FIG. 4, and the closed position, as shown in FIG. 5. In a number of embodiments, gripper 312 can be configured in the open position (as shown in FIG. 4) to open around an individual crop, such as a single strawberry growing on a strawberry plant, or another suitable crop. In many embodiments, gripper 312 can be configured in the closed position (as shown in FIG. 5) to securely hold the individual crop, such as strawberry 535, when picking apparatus 110 (FIGS. 1-3) is moved and/or rotated around central axis 311 (FIG. 3).

In various embodiments, gripper 312 can include a first claw piece 410 and a second claw piece 420. In other embodiments, gripper 312 can include a single claw or scoop piece and one or more support pieces. In yet other embodiments, gripper 312 can include three or more claw pieces. In many embodiments, first claw piece 410 can include a first claw frame 411 and/or second claw piece 420 can include a second claw frame 421. In some embodiments, first claw frame 411 can provide rigid support for first claw piece 410, and/or second claw frame 421 can provide rigid support for second claw piece 420. In a number of embodiments, first claw frame 411 and/or second claw frame 421 can be made of a suitable rigid polymer (e.g., polycarbonate (PC), acrylonatrile butadiene styrene (ABS)), metal (e.g., aluminum), or another suitable material.

In many embodiments, first claw piece 410 can include a first claw surface 412, and/or second claw piece 420 can include a second claw surface 422. In a number of embodiments, first claw surface 412 can be attached to and/or can at least partially cover first claw frame 411, and/or second claw surface 422 can be attached to and/or can at least partially cover second claw frame 421. In a number of embodiments, first claw surface 412 and/or second claw surface 422 can be made of a soft and/or elastic material, such as silicone rubber, thermoplastic elastomer (TPE) (e.g., thermoplastic polyurethane (TPU)), rubber, foam, neoprene, or another suitable material that can provide a gentle, soft, and/or compliant surface for contacting, without damaging, the crops, and/or that can be suitable for contact with food. For example, first claw surface 412 and/or second claw surface 422 can be made of 20 A Shore durometer silicone rubber. First claw surface 412 and/or second claw surface 422 can be within a range of durometer, such as below 50 A Shore durometer.

In many embodiments, first claw piece 410 can include a first tip 413, and/or second claw piece 420 can include a second tip 423. In many embodiments, first tip 413 and/or second tip 423 can be wedge-shaped and/or configured to be inserted between crops to separate an individual crop from proximate crops (e.g., a cluster of crops) in order to pick the individual crop without damaging the proximate crops. For example, if a crop to be picked is located between two other nearby crops, first tip 413 can be configured to be wedged between the crop to be picked and another one of the nearby crops, and second tip 423 can be configured to be wedged between the crop to be picked and the other one of the nearby crops, which can separate and/or isolate the individual crop to be picked from the nearby crops without damaging the nearby crops.

In some embodiments, first claw piece 410 can include a retention surface 518, and/or second claw piece 420 can include a retention surface 528. Retention surface 518 and/or retention surface 528 can be configured to securely hold the crop (e.g., strawberry 535) in gripper 312. In several embodiments, such as shown in FIGS. 5, retention surface 518 and/or retention surface 528 can each include a concave surface, which can at least partially surround the crop (e.g., strawberry 535) to facilitate securely holding the crop.

In several embodiments, gripper 312 can be spring biased to be in the open position, as shown in FIG. 4. In a number of embodiments, gripper 312 can include a displacement block 430, which can be coupled to spoke 317, and which can be configured to slide radially inward and outward along spoke 317. In several embodiments, displacement block 430 can include a pin 431, which can facilitate coupling displacement block 430 to spoke 317. In many embodiments, spoke 317 can include a compression spring 432, which can compress when displacement block 430 is adjusted outward along spoke 317 to adjust gripper 312 to the closed position, as shown in FIG. 5, and which can be biased to press displacement block 430 inward along spoke 317 to adjust gripper 312 to the open position, as shown in FIG. 4. In various embodiments, gripper 312 can include one or more spring guards, such as spring guard 433 and/or spring guard 434, which can cover and/or protect compression spring 432.

In many embodiments, a first claw piece 410 can include a first displacement mounting portion 416 and a spoke mounting portion 417, and/or second claw piece 420 can include a second displacement mounting portion 426 and a spoke mounting portion 427. In a number of embodiments, spoke mounting portion 417 and/or spoke mounting portion 427 can be hingedly coupled to spoke 317, such as at a hinge 419 and/or a hinge 429, respectively. In several embodiments, first displacement mounting portion 416 and/or second displacement mounting portion 426 can be linkedly attached to displacement block 430, such that adjusting the position of displacement block 430 can adjust first claw piece 410 and/or second claw piece 420 between the open position, as shown in FIG. 4, and the closed position, as shown in FIG. 5, such as by rotating first claw piece 410 around hinge 419 and/or rotating second claw piece 420 around hinge 429.

In many embodiments, gripper 312 can include a first strip 414, a first linkage piece 415, a second strip 424, and/or a second linkage piece 425. First strip 414 and/or second strip 424 can be coupled to displacement block 430. First linkage piece 415 can be hingedly coupled to first displacement mounting portion 416 at a hinge 418, and can be coupled, such as slidably coupled, to first strip 414. Second linkage piece 425 can be hingedly coupled to second displacement mounting portion 426 at a hinge 428, and can be coupled, such as slidably coupled, to second strip 424. In many embodiments, first strip 414 and/or second strip 424 can be made of a flexible and/or abrasive-resistant semi-rigid material, such as ultra-high-molecular-weight (UHMW) polyethylene (UHMWPE). As shown in FIGS. 4-5, as displacement block 430 is adjusted radially outward on spoke 317, first strip 414 can push first claw piece 410 forward to rotate around hinge 419 to the closed position, and first linkage piece 415 can slide outwardly along first strip 414 away from displacement block 430 as the position of first displacement mounting portion 416 is adjusted. Similarly, as displacement block 430 is adjusted radially outward on spoke 317, second strip 424 can push second claw piece 420 forward to rotate around hinge 429 to the closed position, and second linkage piece 425 can slide outwardly along second strip 424 away from displacement block 430 as the position of second displacement mounting portion 426 is adjusted.

In several embodiments, as displacement block 430 is adjusted radially outward on spoke 317, first strip 414 and/or second strip 424 can bend backward (i.e., toward a center of frame 316 (FIG. 3)) to account for first claw piece 410 and/or second claw piece 420, respectively, not fully pushing forward in their rotation around hinge 419 and/or hinge 429, respectively. For example, if gripper 312 is utilized to pick a large-size crop, the size of the crop can prevent first claw piece 410 and/or second claw piece 420 from being fully pushed forward in their rotation around hinge 419 and/or hinge 429, respectively. When displacement block 430 is adjusted radially outward on spoke 317, first strip 414 and/or second strip 424 can provide spring-loaded bias on first claw piece 410 and/or second claw piece 420, respectively, to securely hold a crop (e.g., strawberry 535) in gripper 312. In a number of embodiments, the spring-loaded bending of first strip 414 and/or second strip 424 can advantageously allow gripper 312 to pick crops of various different sizes and securely hold those different-sized crops without damaging the crops. For example, gripper 312 can be configured to pick strawberries ranging from small-sized strawberries to large-sized strawberries.

Figure 6:
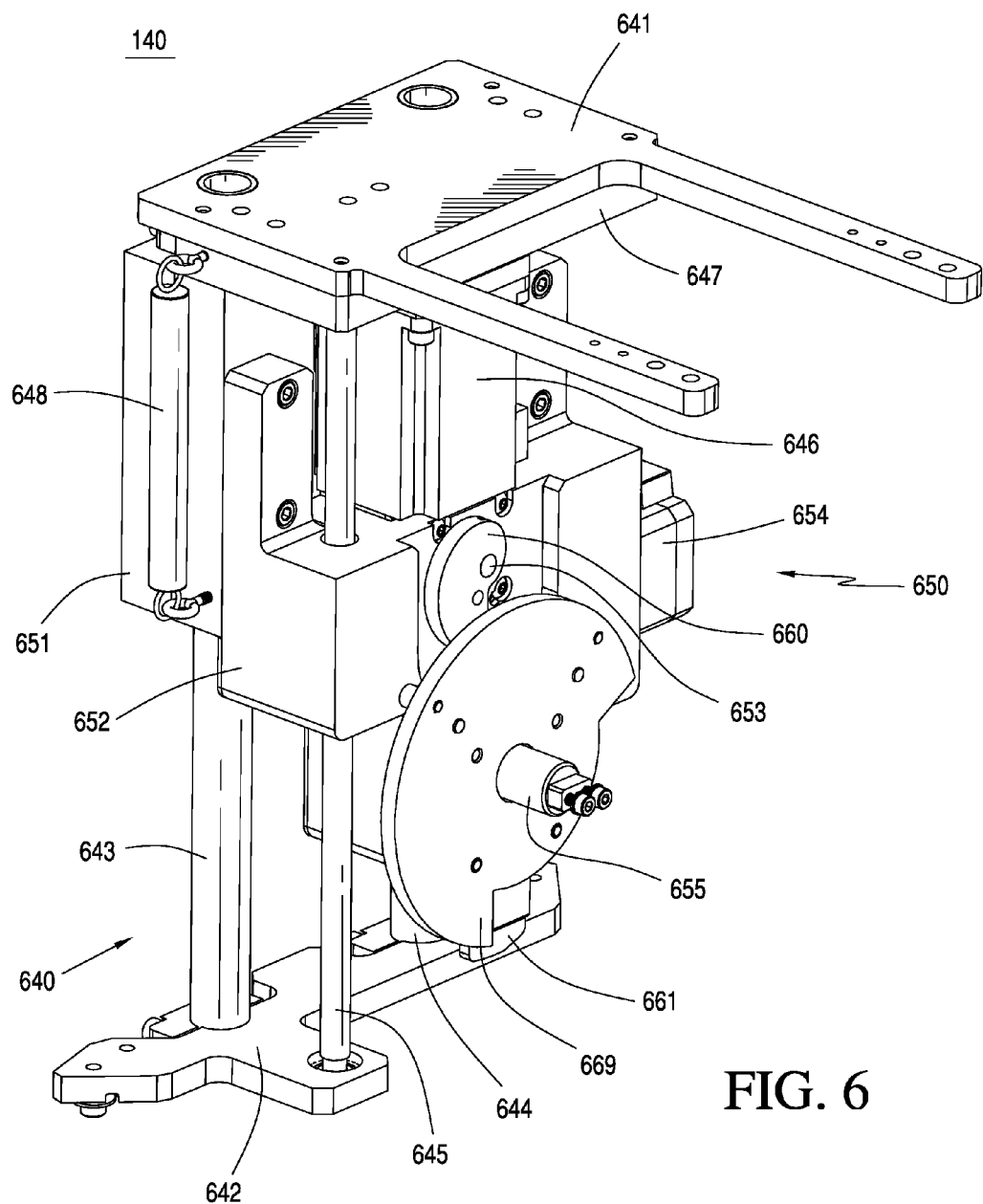
FIG. 6 illustrates a top, front, left side perspective view of a carriage assembly, showing a stationary cam, and covers of a top base, a guide assembly, and a gear housing, according to the embodiment of FIG. 1.
Figure 7:
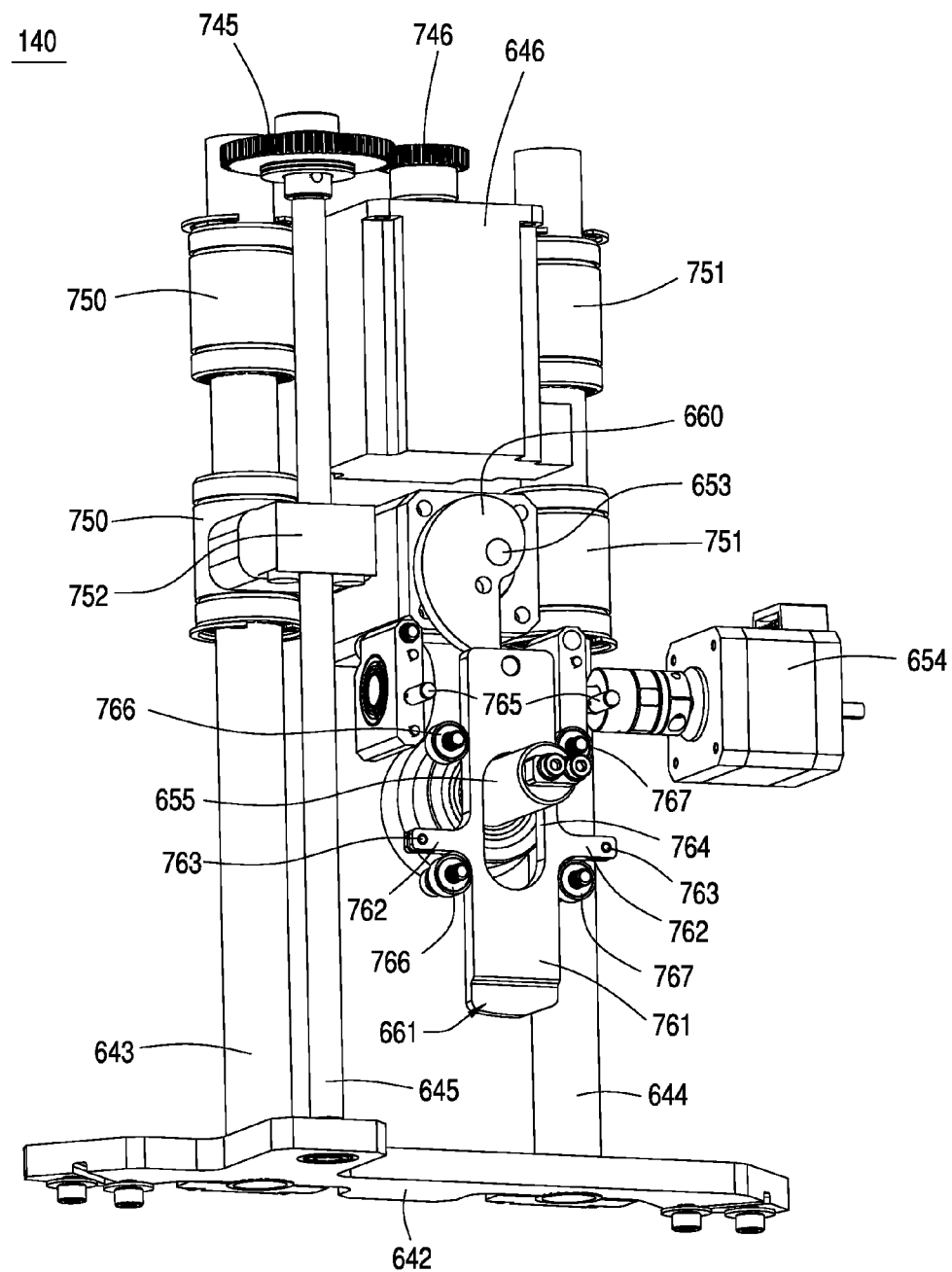
FIG. 7 illustrates a bottom, front, left side perspective view of various internal components of the carriage assembly of FIG. 6, and not showing the stationary cam and the covers of the top base, the guide assembly, and the gear housing of FIG. 6.
Figure 8:
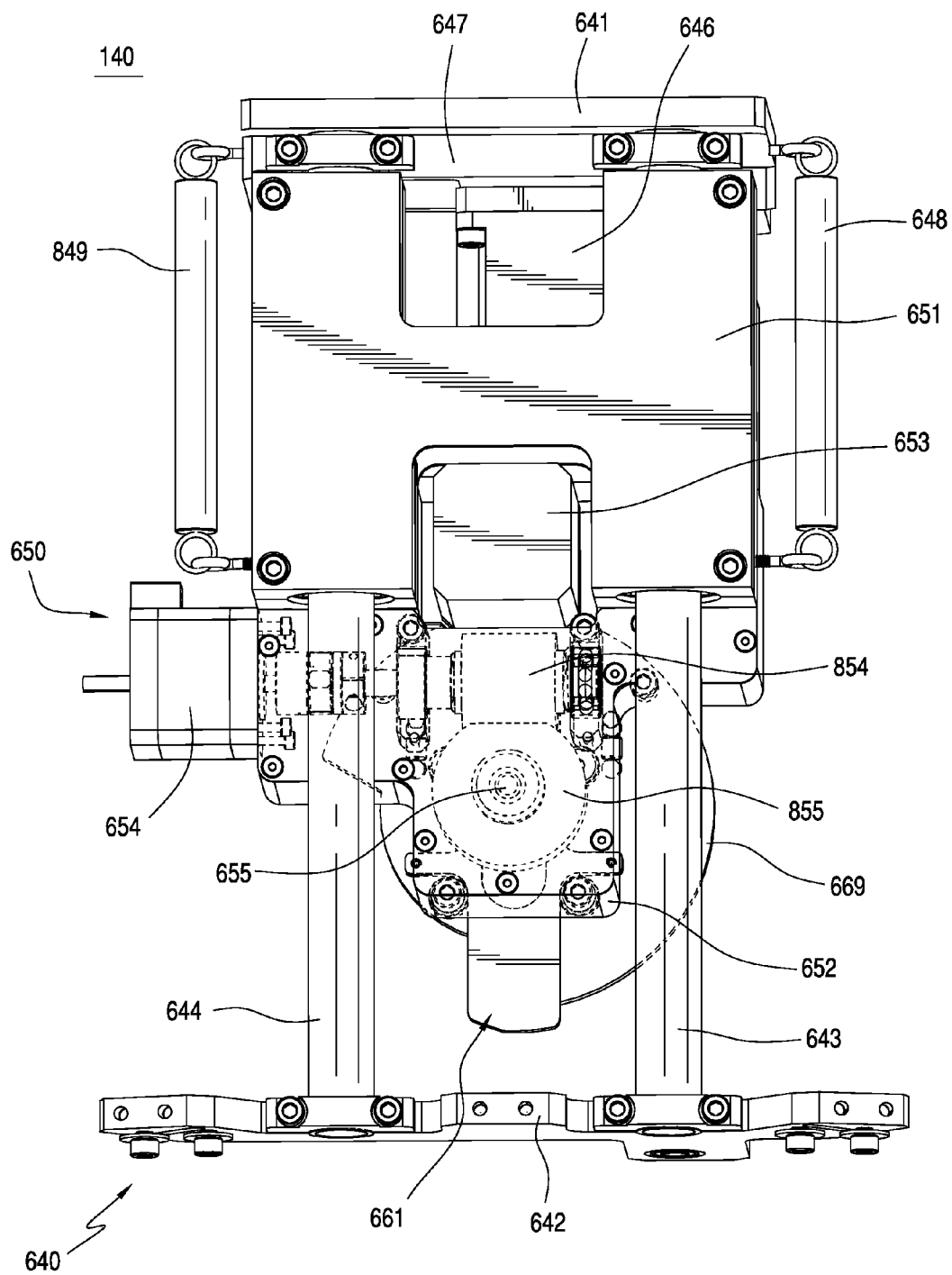
FIG. 8 illustrates a rear view of the carriage assembly of FIG. 6, showing the stationary cam and the covers of the top base, the guide assembly, and the gear housing of FIG. 6, and showing various internal components in the gear housing.

Turning ahead in the drawings, FIG. 6 illustrates a top, front, left side perspective view of carriage assembly 140, showing a stationary cam 669, and covers of a top base 641, a guide assembly 651, and a gear housing 652. FIG. 7 illustrates a bottom, front, left side perspective view of various internal components of carriage assembly 140, and not showing stationary cam 669 and the covers of top base 641, guide assembly 651, and gear housing 652. FIG. 8 illustrates a rear view of carriage assembly 140, showing stationary cam 669 and the covers of top base 641, guide assembly 651, and gear housing 652, and showing various internal components in gear housing 652. Carriage assembly 140 is merely exemplary, and embodiments of the carriage assembly are not limited to embodiments presented herein. The carriage assembly can be employed in many different embodiments or examples not specifically depicted or described herein. In many embodiments, carriage assembly can include a carriage support assembly 640 and a carriage 650. In many embodiments, carriage 650 can be vertically adjustable with respect to carriage support assembly 640.

In a number of embodiments, carriage support assembly 640 can include top base 641 and/or a bottom base 642. In several embodiments, carriage support assembly 640 can include a left guide pole 643 and/or a right guide pole 644, which can each extend from top base 641 to bottom base 642. In some embodiments carriage support assembly can include a vertical adjustment shaft 645. In many embodiments, vertical adjustment shaft 645 can extend from top base 641 to bottom base 642, and can rotate with respect to top base 641 and bottom base 642. In a number of embodiments, vertical adjustment shaft 645 can be a threaded shaft, such as a lead screw. In a number of embodiments, top base 641 can include a gear enclosure 647. In various embodiments, carriage support assembly 640 can include a motor 646. Motor 646 can be a stepper motor or another suitable motor. In a number of embodiments, motor 646 can control the rotation of vertical adjustment shaft 645. For example, as shown in FIG. 7, which shows the components within gear enclosure 647 (FIGS. 6, 8) and which does not show the cover of gear enclosure 647 itself, motor 646 can be coupled to a gear 746 inside first gear enclosure 647, and vertical adjustment shaft 645 can be coupled to a gear 745 inside gear enclosure 647 (FIGS. 6, 8). Gear 745 can be positioned to engage with gear 746 within gear enclosure 647 (FIGS. 6, 8). By rotating vertical adjustment shaft 645, motor 646 can control the vertical position of carriage 650.

In several embodiments, carriage 650 can include guide assembly 651. As shown in FIG. 7, which shows the components within guide assembly 651 and which does not show the cover of guide assembly 651 itself, guide assembly 651 can include left linear bearings 750 and/or right linear bearings 751. In various embodiments, left linear bearings 750 can be guide the vertical motion of carriage 650 along left guide pole 643, and/or right linear bearings 751 can guide the vertical motion of carriage 650 along right guide pole 644. In several embodiments, carriage assembly 140 can include one or more springs, such as spring 648 and spring 849, which can extend from carriage 650 to top base 641 of carriage support assembly 640. Spring 648 and spring 849 can be extension springs, which can beneficially support carriage 650 to decrease the force required to vertically lift carriage 650 with respect to carriage support assembly 640.

In many embodiments, carriage 650 can include gear housing 652. As shown in FIG. 7, which shows the components inside gear housing 652 and which does not show the cover of gear housing 652 itself, carriage 650 can include a carriage position piece 752, which can be attached to vertical adjustment shaft 645 and can be configured to vertically adjust the position of the carriage upon rotational movement of vertical adjustment shaft 645. In several embodiments, carriage position piece 752 can be a lead screw nut that has a threading corresponding to vertical adjustment shaft 645.

In a number of embodiments, carriage 650 can include a rotational shaft 655. Rotational shaft 655 can be configured to couple to picking apparatus 110 (FIG. 1-3). For example, rotational shaft 655 can attach to attachment mechanism 321 (FIG. 3). In many embodiments, carriage 650 can include a motor 654. Motor 654 can be a stepper motor or another suitable motor. In several embodiments, motor 654 can control the rotation of a rotational shaft 655 and/or picking apparatus 110. For example, motor 654 can be configured to control the rotational positioning of the grippers (e.g., 312-315 (FIG. 3)) on picking apparatus 110 (FIGS. 1-3). As shown in FIG. 8, which shows various internal components within gear housing 652 (FIG. 6), motor 654 can be coupled to a gear 854 inside gear housing 652 (FIG. 6), and rotational shaft 655 can be coupled to a gear 855 inside gear housing 652 (FIG. 6). Gear 854 can be positioned to engage with gear 855 within gear housing 652 (FIG. 6). For example, gear 854 can be a worm, and gear 855 can be a corresponding worm gear. By rotating rotational shaft 655, motor 654 can control the rotational position of picking apparatus 110 (FIG. 1-3).

Figure 10:
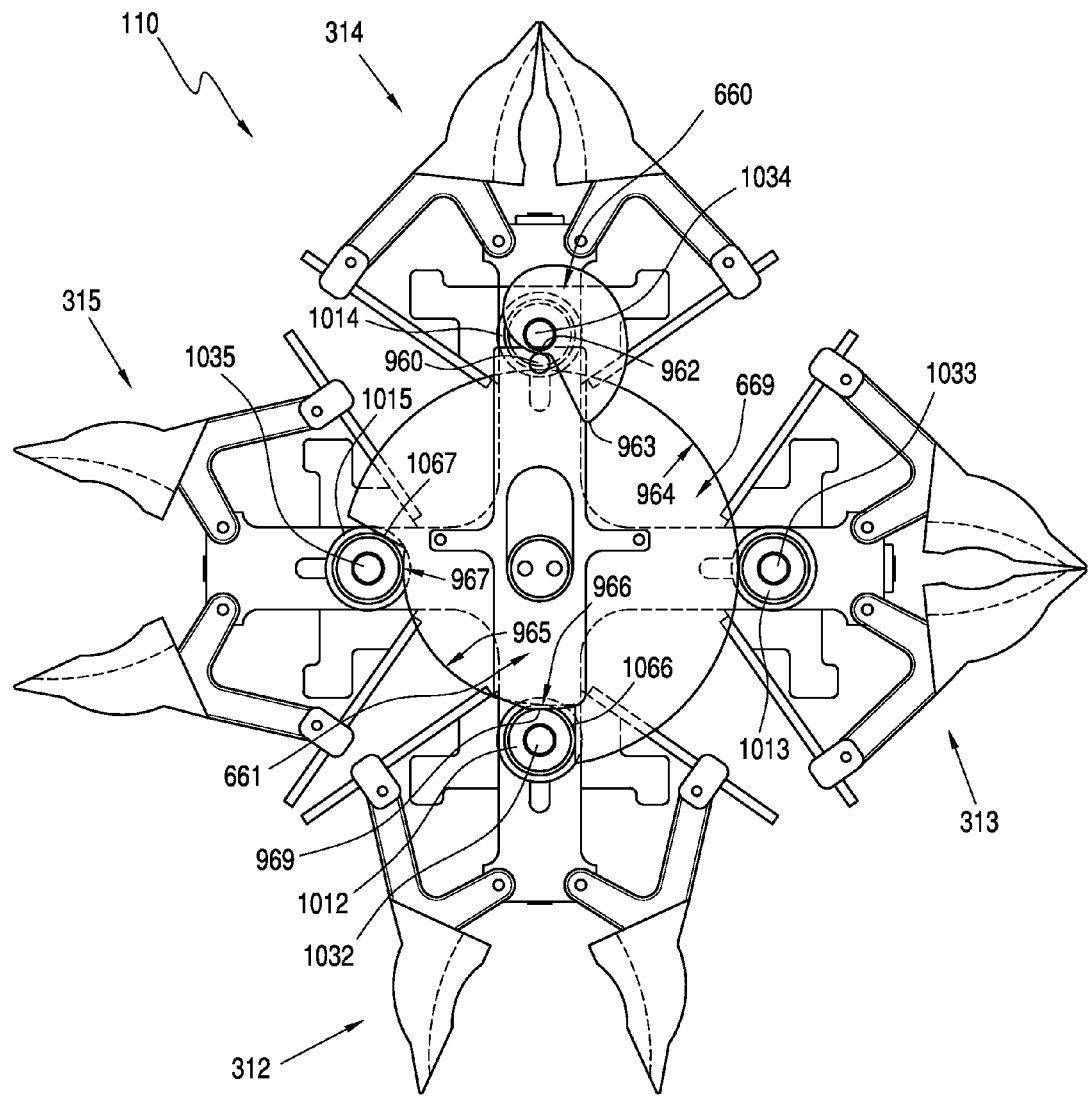
FIG. 10 illustrates a rear view of the actuation cam, actuator, and stationary cam of FIG. 9, and the picking apparatus of FIG. 3 with a gripper in the picking position being in the open position.
Figure 11:
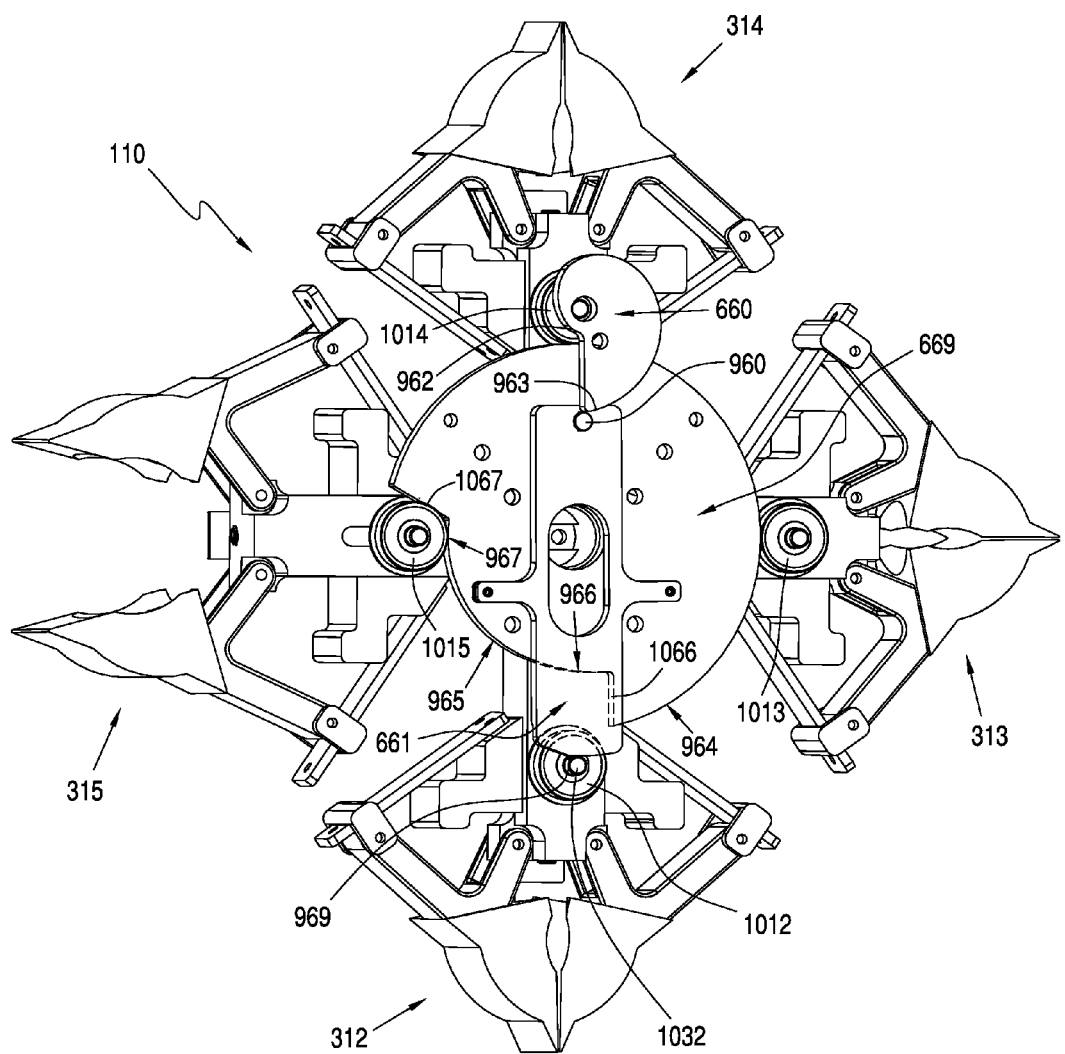
FIG. 11 illustrates a rear, right side perspective view of the actuation cam, actuator, and stationary cam of FIG. 9, and the picking apparatus of FIG. 3 with the gripper of FIG. 10 in the picking position being in the closed position.

In several embodiments, carriage 650 can include stationary cam 669 (FIGS. 6, 8, not shown in FIG. 7). In a number of embodiments, rotational shaft 655 can pass through a central region of stationary cam 669. In many embodiments, stationary cam 669 can facilitate controlling the adjustment position (e.g., open position, closed position) of the grippers (e.g., 312-315 (FIG. 3)) on picking apparatus 110 (FIGS. 1-3) as the grippers (e.g., 312-315 (FIG. 3)) rotate around central axis 311 (FIG. 3), as shown in FIGS. 10-11 and described below in greater detail.

In some embodiments, carriage 650 can include a actuation cam 660. Actuation cam 660 can be configured to facilitate controlling the adjustment position (e.g., open position, closed position) of the grippers (e.g., 312-315 (FIG. 3)) on picking apparatus 110 (FIGS. 1-3) as each of the grippers (e.g., 312-315 (FIG. 3)) are positioned above and utilized to pick a crop, as shown in FIG. 10-11 and described below in greater detail. In many embodiments, actuation cam 660 can be a snail drop cam. In various embodiments, carriage 650 can include a motor 653. Motor 653 can be a stepper motor or another suitable motor. In many embodiments, motor 653 can be coupled to and/or can control the rotation of actuation cam 660

In some embodiments, carriage 650 can include an actuator 661. As shown in FIG. 7, which shows components of carriage 650 (FIGS. 6, 8) with stationary cam 669 (FIGS. 6, 8) removed, actuator can include a drive portion 761, which can fit vertically between left actuator bearings 766 and right actuator bearings 767 on carriage 650 (FIGS. 6, 8), and can adjust vertically to transfer the control position of actuation cam 660 to the gripper (e.g., 312-315 (FIG. 3)), which can adjust the adjustment position (e.g., open position, closed position) of the gripper (e.g., 312-315 (FIG. 3)), as shown in FIGS. 10-11 and described below in greater detail. In various embodiments, drive portion 761 can include a sliding slot 764, which can allow actuator 661 to surround rotational shaft 655, and which can allow vertical movement of actuator 661 with respect to rotational shaft 655. In a number of embodiments, actuator 661 can include guide portions 762, which can each fit horizontally between left actuator bearings 766 and right actuator bearings 767, respectively. For example, guide portions 762 can guide the vertical adjustment of actuator 661 between, and prevent the vertical movement beyond, the top bearings and bottom bearings of left bearings 766 and/or right bearings 767. In certain embodiments guide portions 762 can include attachment pieces 763, which can attach actuator 661 to attachment bases 765 on gear housing 652 (FIGS. 6, 8) of carriage 650 (FIGS. 6, 8) via springs (e.g., extension springs) or other suitable elastic components, in order to bias actuator 661 in a vertically upward position to engage with actuation cam 660.

Figure 9:
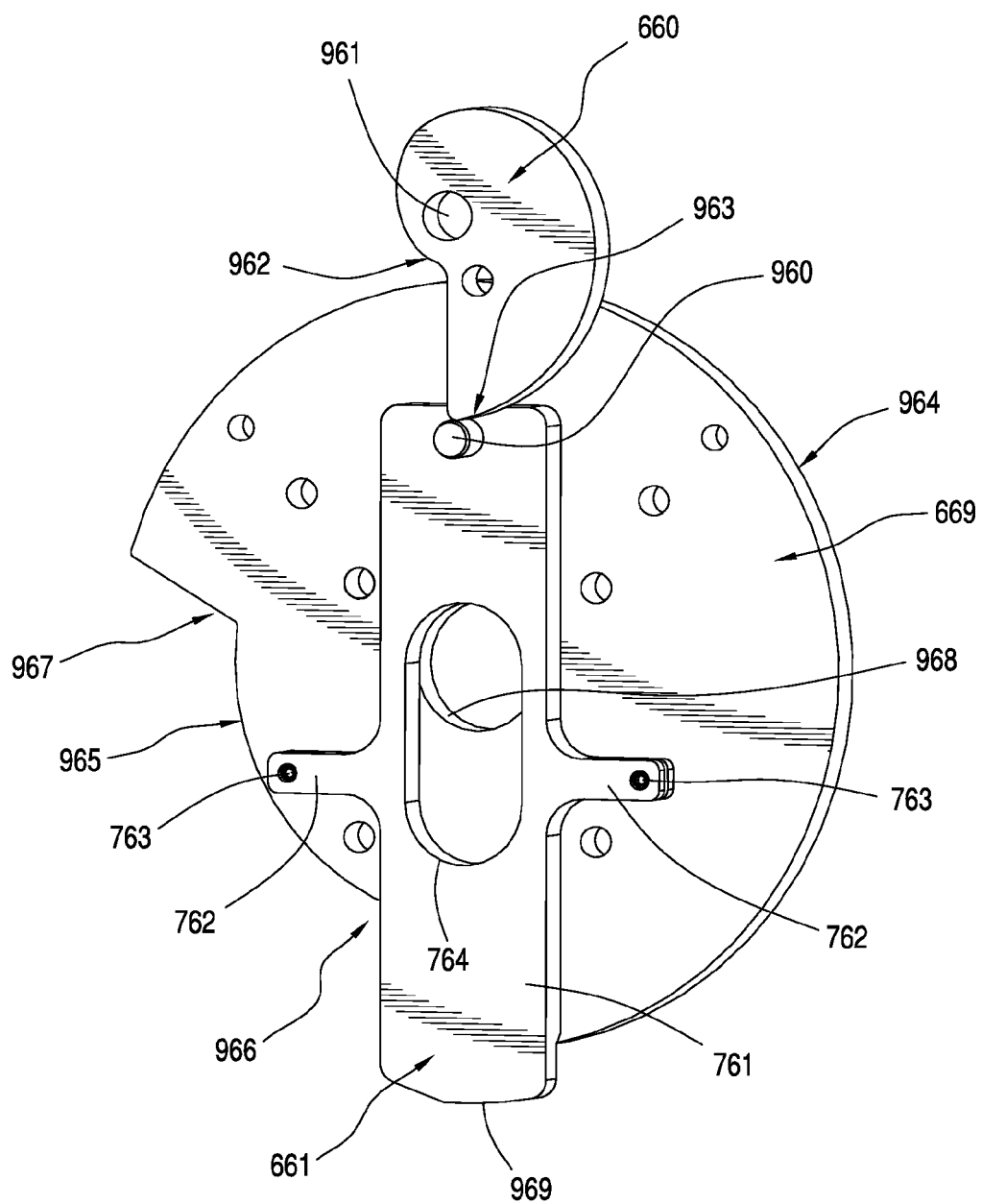
FIG. 9 illustrates a top, rear, left side perspective view of an actuation cam, an actuator, and a stationary cam of the carriage assembly of FIG. 6.

Turning ahead in the drawings, FIG. 9 illustrates a top, rear, left side perspective view of actuation cam 660, actuator 661, and stationary cam 669. Actuation cam 660, actuator 661, and stationary cam 669 are merely exemplary, and embodiments of the actuation cam, actuator, and stationary cam are not limited to embodiments presented herein. The actuation cam, actuator, and stationary cam can be employed in many different embodiments or examples not specifically depicted or described herein. In many embodiments, actuator 661 can include a cam interface piece 960, which can follow the shape of actuation cam 660 to adjust the position of actuator 661. In several embodiments, actuation cam 660 can be attached to motor 653 (FIGS. 6-8) at rotation point 961, and actuation cam 660 can rotate around rotation point 961. In many embodiments, actuation cam 660 can rotate in a counter-clockwise direction, as viewed from the rear perspective shown FIG. 9. As actuation cam 660 rotates, cam interface piece 960 can move along actuation cam 660 from a base point 962 of actuation cam 660 to a peak point 963 of actuation cam 660, which can push actuator 661 vertically downward. As actuation cam 660 rotates further, cam interface piece 960 can drop back from peak point 963 to base point 962.

In several embodiments, actuator 661 can include a gripper interface portion 969, which can interface with a gripper (e.g., 312-315 (FIG. 3)) on picking apparatus 110 (FIGS. 1-3) to adjust the adjustment position of the gripper (e.g., 312-315 (FIG. 3)) between the open position (as shown in FIG. 4) and the closed position (as shown in FIG. 5). The gradual, continuous increase of actuation cam 660 can beneficially allow motor 653 (FIGS. 6-8) to precisely control the vertical position of actuator 661, which can advantageously allow motor 653 to precisely control the adjustment position of the gripper (e.g., 312-315 (FIG. 3)) on picking apparatus 110 (FIGS. 1-3). For example, motor 653, actuation cam 660, and actuator 661 can be used to precisely adjust the position of first tip 413 (FIGS. 4-5) of first claw piece 410 (FIGS. 4-5) and second tip 423 (FIGS. 4-5) of second claw piece 420 (FIGS. 4-5) in order to fit around an individual crop to be picked, and to separate and/or isolate the individual crop to be picked from the other nearby crops without damaging the nearby crops.

In a number of embodiments, stationary cam 669 can include a circular slot 968, which can be configured to surround rotational shaft 655 (FIGS. 6-7). In several embodiments, stationary cam 669 can have a fixed position with respect to carriage 650 (FIGS. 6, 8), and the grippers (e.g., 312-315 (FIG. 3)) on picking apparatus 110 (FIGS. 1-3) can rotate around stationary cam 669. In many embodiments, the rotational path of stationary cam 669 can include a first portion 964. Stationary cam 669 can be configured to hold the grippers (e.g., 312-315 (FIG. 3)) on picking apparatus 110 (FIGS. 1-3) in a closed position (as shown in FIG. 5) along first portion 964 of the rotational path. In several embodiments, the rotational path of stationary cam 669 can include a second portion 965. In a number of embodiments, second portion 965 of the rotational path can include a release position 967 and a picking position 966. Stationary cam 669 can be configured to allow the grippers (e.g., 312-315 (FIG. 3)) on picking apparatus 110 (FIGS. 1-3) to open to the open position (as shown in FIG. 4) along second portion 965 of the rotational path from release position 967 to picking position 966.

Turning ahead in the drawings, FIG. 10 illustrates a rear view of actuation cam 660, actuator 661, stationary cam 669, and picking apparatus 110 with gripper 312 in picking position 966 being in the open position. FIG. 11 illustrates a rear, right side perspective view of actuation cam 660, actuator 661, stationary cam 669, and picking apparatus 110 with gripper 312 in picking position 966 being in the closed position. In a number of embodiments, gripper 312 can include a displacement pin 1032 and/or a bearing 1012. In a number of embodiments, displacement pin 1032 can be identical to or attached to pin 431 (FIGS. 4-5). In many embodiments, displacement pin 1032 can be coupled to displacement block 430 (FIGS. 4-5), such that adjusting displacement pin 1032 can adjust displacement block 430. In many embodiments, bearing 1012 can be centered on displacement pin 1032, and can rotate along the rotational path of stationary cam 669. Similarly, gripper 313 can include a displacement pin 1033 and/or a bearing 1013; gripper 314 can include a displacement pin 1034 and/or a bearing 1014; and/or gripper 315 can include a displacement pin 1035 and/or a bearing 1015. Displacement pin 1033, displacement pin 1034, and/or displacement pin 1035 can be similar or identical to displacement pin 1032. Bearing 1013, bearing 1014, and/or bearing 1015 can be similar or identical to bearing 1012.

In many embodiments, motor 654 (FIGS. 6-8) can rotate picking apparatus 110 in a counter-clockwise direction, as viewed from the rear perspective shown in FIGS. 10-11. Gripper 312 can be rotated to picking position 966 of second portion 965 of the rotational path of the grippers (e.g., 312-315 (FIG. 3)) along stationary cam 669. In many embodiments, stationary cam 669 can include a stopping edge 1066, which can stop bearing 1012 in the rotation of picking apparatus 110 to stop gripper 312 at picking position 966. In many embodiments, when gripper 312 is in picking position 966, gripper 312 can be facing downward to allow gripper 312 to pick a crop from a growing bed. When gripper 312 is rotated to picking position 966, actuation cam 660 can be rotated such that cam interface piece 960 of actuator 661 can be at base point 962 of actuation cam 660 and actuator 661 is adjusted upwards (e.g., retracted) with respect to stationary cam 669. When actuator 661 is in the retracted position, as shown in FIG. 10, gripper interface portion 969 of actuator 661 can be at or proximate to second portion 965 of stationary cam 669, such that gripper 312 can remain in the open position.

In several embodiments, as gripper 312 rotates toward picking position 966, gripper 315 can rotate along the rotational path of stationary cam 669 from first portion 964 to second portion 965 at release position 967. In many embodiments, stationary cam 669 can include a release edge 1067, which can allow gripper 315 to gradually open from the closed position (as shown in FIG. 5) to the open position (as shown in FIG. 4) at release position 967. When gripper 315 is rotated to release position 967 and opens to the open position, gripper 315 can release a crop that it is holding, such as in a collection device. When gripper 312 is at picking position 966 and gripper 315 is at release position 967, grippers 313 and 314 can be positioned along first portion 964 of the rotational path of stationary cam 669, which can hold grippers 313 and 314 in the closed position, as shown in FIG. 10. For example, grippers 313 and 314 can each be holding a crop.

In many embodiments, at picking position 966 and in the open position, as shown in FIG. 10, gripper 312 can be ready to pick a crop from a plant. In several embodiments, carrier 170 (FIG. 1) can move carriage support assembly 140 such that gripper 312 is positioned over the crop to be picked. Motor 653 (FIGS. 6-8) can rotate actuation cam 660 to engage gripper interface portion 969 of actuator 661 with displacement pin 1032 of gripper 312 to adjust the position of first claw piece 410 (FIGS. 4-5) and second claw piece 420 (FIGS. 4-5) of gripper 312 in order to fit around the individual crop to be picked. For example, if the crop is a larger, such as a large-sized strawberry, gripper 312 can be set to a wider opening in the open position, and if the crop is smaller, such as a small-sized strawberry, gripper 312 can be set to a narrow opening in the open position, which can allow gripper 312 to separate and/or isolate the individual crop to be picked from the other nearby crops without damaging the nearby crops.

When gripper 312 is adjusted to the appropriate opening width for the crop to be picked, carriage support assembly 140 can lower carriage 150 such that first claw piece 410 (FIGS. 4-5) and second claw piece 420 (FIGS. 4-5) of gripper 312 can surround the crop to be picked. Motor 653 (FIGS. 6-8) can rotate actuation cam 660 such that cam interface piece 960 can move along actuation cam 660 to peak point 963, which can push extend actuator 661 to an extended position, as shown in FIG. 11. As actuator 661 is extended, gripper interface portion 969 of actuator 661 can push displacement pin 1032 to adjust the position of gripper 312 to the closed position (as shown in FIG. 11). When gripper 312 is in the closed position, bearing 1012 of gripper 312 can be extended beyond stopping edge 1066 of stationary cam 669, such that gripper 312 can be rotated along first portion 964 of the rotational path of stationary cam 669. In many embodiments, gripper 312 can securely hold the picked crop as gripper 312 rotates along first portion 964. After gripper 312 picks the crop, motor 654 (FIGS. 6-8) can rotate picking apparatus 110 such that gripper 315 is rotated to picking position 966. Although picking apparatus 110 is shown with 4 grippers (e.g., 312-315), picking apparatus 110 can include fewer or additional grippers, and first portion 964 and second portion 965 of the rotational path of stationary cam 669 can be adjusted accordingly.

Figure 12:
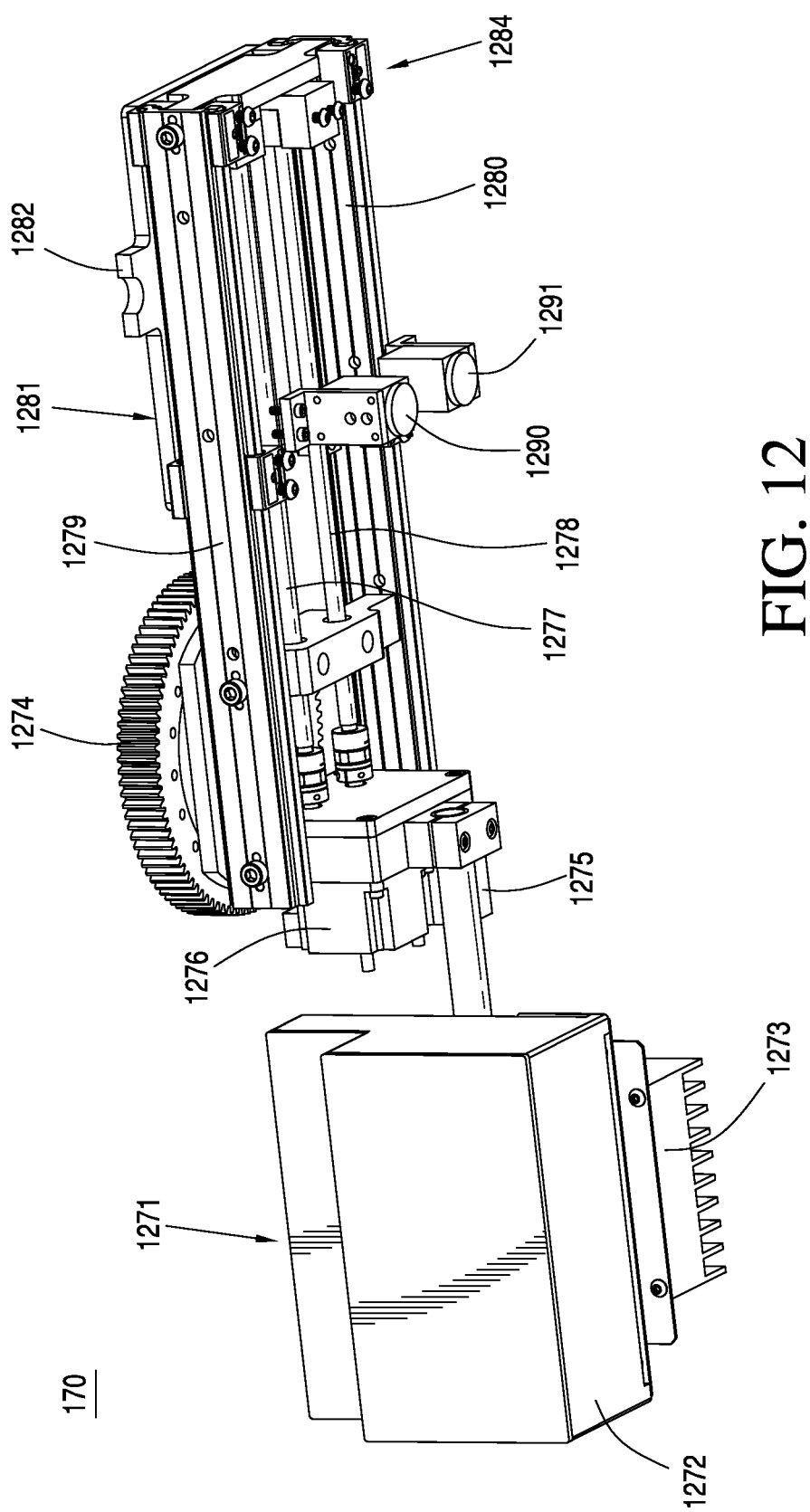
FIG. 12 illustrates a bottom, rear, right side perspective view of a carrier assembly, according to the embodiment of FIG. 1.
Figure 13:
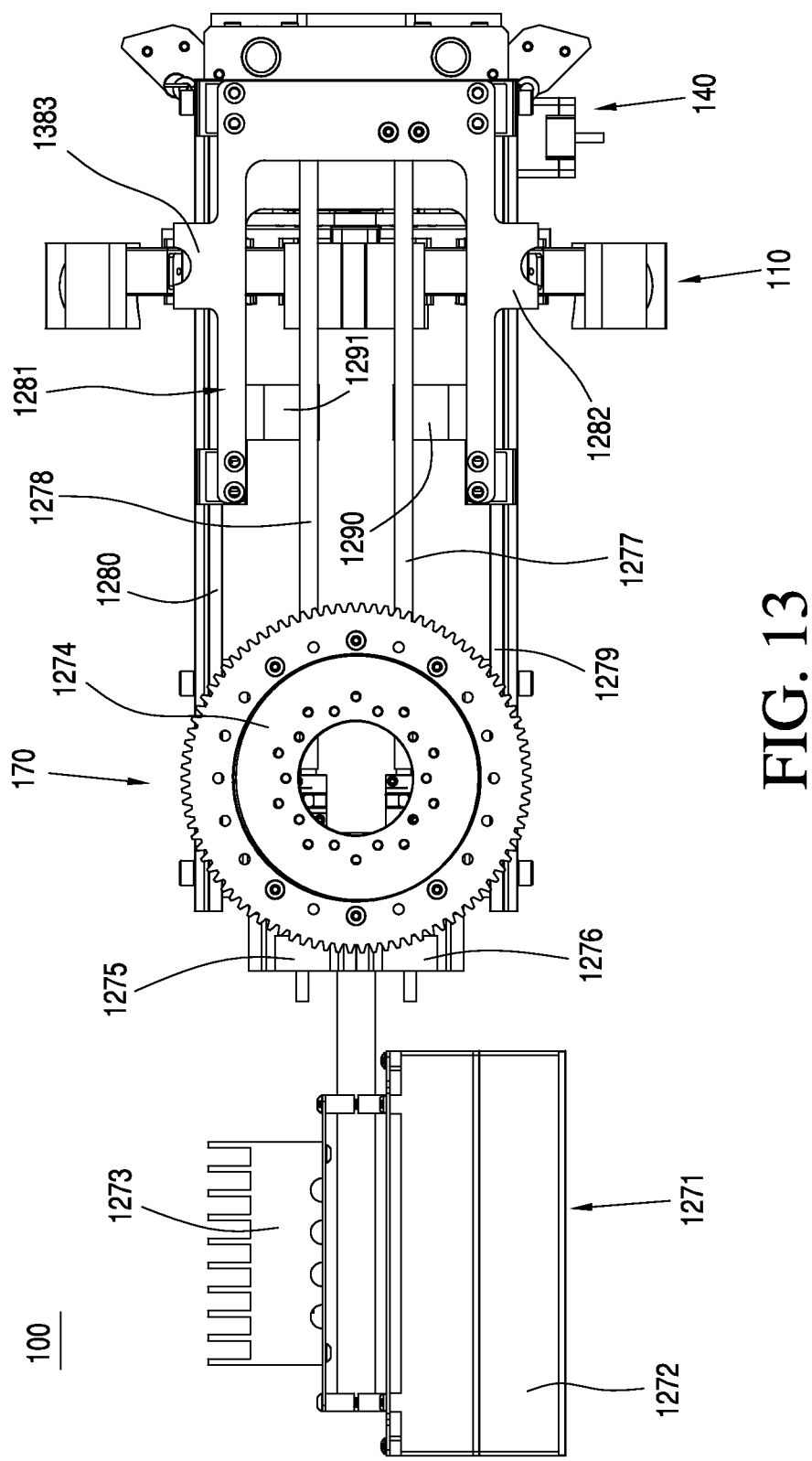
FIG. 13 illustrates a top view of the harvesting robot of FIG. 1, showing the carrier assembly of FIG. 12 coupled to the carriage assembly of FIG. 6 and the picking apparatus of FIG. 3.

Turning ahead in the drawings, FIG. 12 illustrates a bottom, rear, right side perspective view of carrier assembly 170. FIG. 13 illustrates a top view of harvesting robot 100, showing carrier assembly 170 coupled to carriage assembly 140 (FIGS. 1-2, 6-8) and picking apparatus 110. Carrier assembly 170 is merely exemplary, and embodiments of the carrier assembly are not limited to embodiments presented herein. The carrier assembly can be employed in many different embodiments or examples not specifically depicted or described herein. In several embodiments, carrier assembly 170 can include a mounting bearing 1274. In many embodiments, carrier assembly 170 and/or harvesting robot 100 can be mounted above a plant to be harvested at mounting bearing 1274. In a number of embodiments, mounting bearing 1274 can be a geared slewing bearing, which can be used to rotate carrier assembly 170 and/or harvesting robot 100 with respect to the plant. For example, harvesting robot 100 can rotate in a clockwise and/or counterclockwise direction, as viewed from the top perspective shown FIG. 13, around mounting bearing 1274.

In many embodiments, carrier assembly 170 can include an carriage attachment base 1284, which can be configured to couple to top base 641 (FIGS. 6, 8) in order to couple carriage assembly 140 to carrier assembly 170 and to move carriage assembly 140 with respect carrier assembly 170. In a number of embodiments, carrier assembly 170 can include a motor 1275. Motor 1275 can be a stepper motor or another suitable motor. In several embodiments, motor 1275 can control the rotation of an adjustment shaft 1278 to adjust the position of carriage attachment base 1284 and/or carriage assembly 140 with respect to mounting bearing 1274. In a number of embodiments, adjustment shaft 1278 can be a threaded shaft, such as a lead screw.

Figure 14:
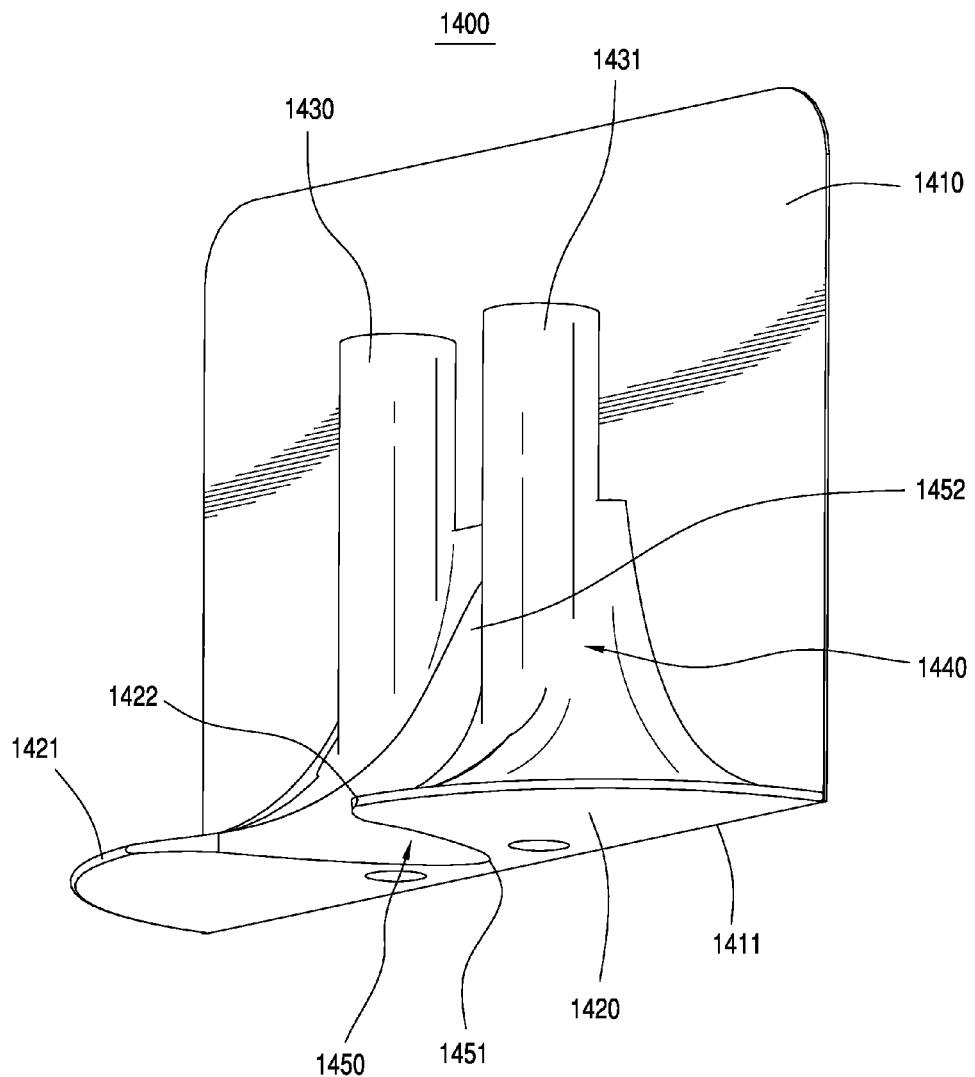
FIG. 14 illustrates a bottom, front, right side perspective view of a foliage displacement mechanism, according to another embodiment.

In some embodiments, carrier assembly 170 can include a foliage displacement base 1281, which can be coupled to a foliage displacement mechanism 1400, as shown in FIG. 14 and described below. In a number of embodiments, foliage displacement mechanism 1400 (FIG. 14) can be attached to foliage displacement base 1281 at attachment portions 1282 and 1383. In many embodiments, carrier assembly 170 can include a motor 1276. Motor 1276 can be a stepper motor or another suitable motor. In various embodiments, motor 1276 can control the rotation of an adjustment shaft 1277 to adjust the position of foliage displacement base 1281 with respect to mounting bearing 1274. In a number of embodiments, adjustment shaft 1277 can be a threaded shaft, such as a lead screw.

In several embodiments, carrier assembly 170 can include rails 1279 and 1280, which can allow carriage attachment base 1284 and/or foliage displacement base 1281 to adjustably slide radially inward and outward with respect to mounting bearing 1274. In many embodiments, carrier assembly 170 can include one or more imaging sensors 1290 and/or 1291. Imaging sensors 1290 and/or 1291 can be cameras configured to detect optical image information. In a number of embodiments, carrier assembly 1271 can include an electronics unit 1271. In some embodiments, electronics unit 1271 can include a control unit 1272 and/or a processing unit 1273. In a number of embodiments, processing unit 1273 can include one or more processors configured to receive information from imaging sensors 1290 and/or 1291 to determine the location of the crops to be harvested. For example, processing unit can be configured to determine that certain crops are ripe and ready to be harvested, and other crops are not yet ripe or are damaged, and should not be harvested. In various embodiments, control unit 1272 can be electrically coupled to processing unit 1273 and/or can include one or more controllers to control the motors in harvesting robot 100, such as motor 646 (FIGS. 6-8), motor 653 (FIGS. 6-8), motor 654 (FIG. 6-8), motor 1275 (FIGS. 12-13), and/or motor 1276 (FIGS. 12-13).

Turning ahead in the drawings, FIG. 14 illustrates a bottom, front, right side perspective view of a foliage displacement mechanism 1400. Foliage displacement mechanism 1400 is merely exemplary, and embodiments of the foliage displacement mechanism are not limited to embodiments presented herein. The foliage displacement mechanism can be employed in many different embodiments or examples not specifically depicted or described herein. In many embodiments, foliage displacement mechanism 1400 can be configured to move foliage of a plant to expose at least a portion of the crops under the foliage, which can allow image sensors 1290 (FIGS. 12-13) and/or 1291 (FIGS. 12-13) to detect the crops and/or allow the grippers (e.g., 312-315 (FIGS. 3, 10-11)) of picking apparatus 110 (FIGS. 1-3) to pick the crops.

Figure 15:
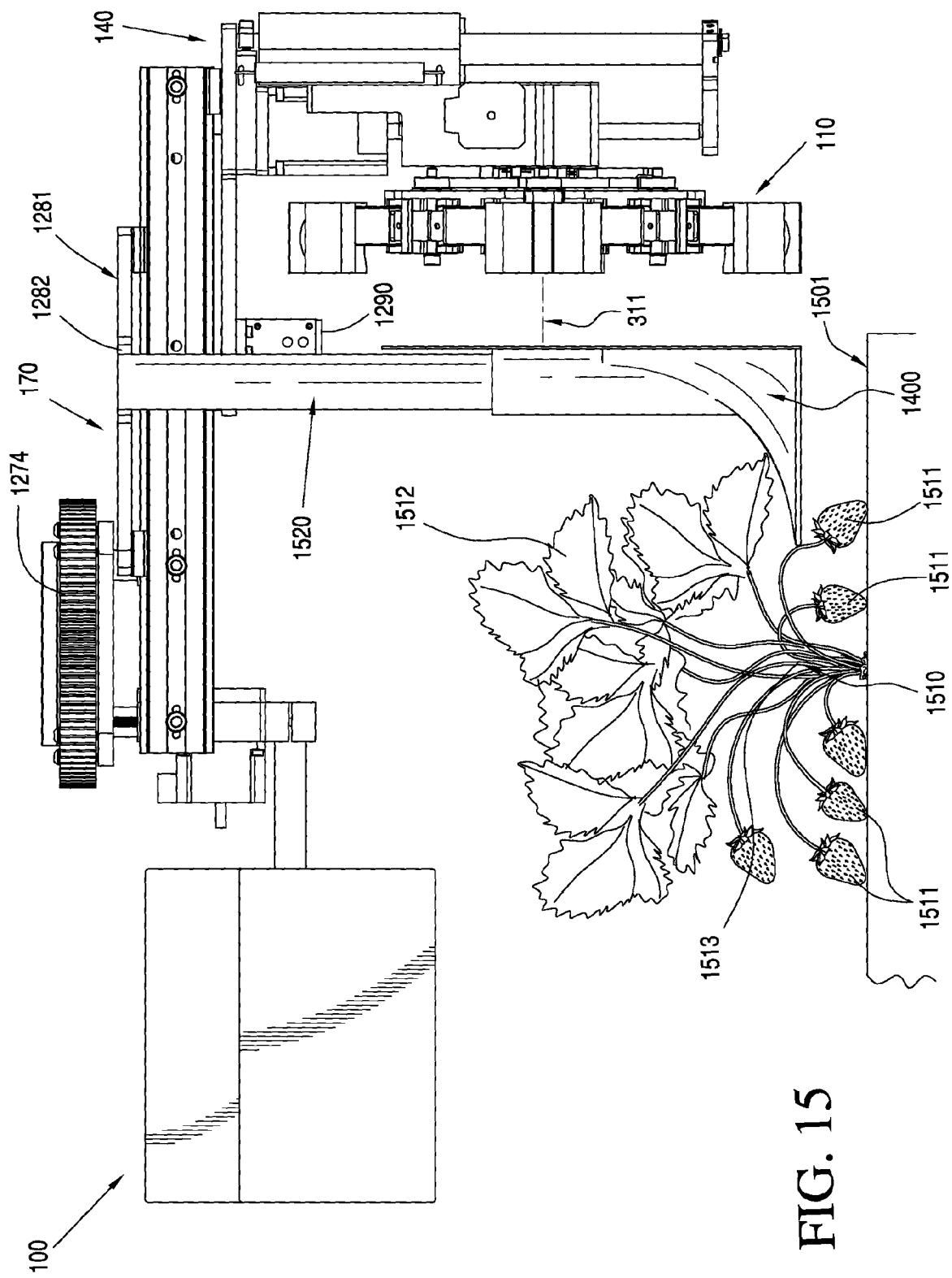
FIG. 15 illustrates a right side view of the harvesting robot of FIG. 1 and the foliage displacement mechanism of FIG. 14 hovering above a plant and a growing bed, with the foliage displacement mechanism in a retracted position.

In several embodiments, foliage displacement mechanism 1400 can include a back surface 1410. In many embodiments, back surface 1410 can have a planar rectangular shape. In a number of embodiments, back surface 1410 can be configured to extend normal to a growing bed of the plant, as shown in FIG. 15 and described below. In several embodiments, foliage displacement mechanism 1400 can include a base 1420. Base 1420 can be configured to extend parallel to the growing bed of the plant from a back edge 1411 at back surface 1410 toward the center of the plant, as shown in FIG. 15 and described below. In a number of embodiments, base 1420 can have a semicircular shape.

In several embodiments, foliage displacement mechanism 1400 can include a surface 1440. Surface 1440 can extend from base 1420 upward to back surface 1410. In a number of embodiments, at least one or more portions of surface 1440 can be curved and/or have a concave shape. In some embodiments, at least one or more portions of surface 1440 can be shaped as at least a portion of an ellipses. In several embodiments, foliage displacement mechanism 1400 can include a channel 1450. In many embodiments, channel 1450 can extend from base 1420 at a bottom channel portion 1451 upwards through surface 1440 to a top channel portion 1452. In some embodiments, base 1420 can extend outward toward the plant from a left side of back surface 1410 to a left front portion 1421 and from a right side of back surface 1410 to a right front portion 1422. In many embodiments, base 1420 can recede back toward back surface 1410 in the center of base 1420 between left front portion 1421 and right front portion 1422 to bottom channel portion 1451.

In a number of embodiments, foliage displacement mechanism 1400 can include attachment mechanisms 1430 and/or 1431. Attachment mechanisms 1430 and 1431 can be configured to attach foliage displacement mechanism 1400 to foliage displacement base 1281 (FIGS. 12-13) at attachment portions 1383 (FIG. 13) and/or 1282 (FIGS. 12-13), respectively. Motor 1276 can be configured to adjust the position of foliage displacement mechanism 1400 to move foliage displacement mechanism 1400 toward or away from the plant. In many embodiments, as foliage displacement mechanism 1400 is moved toward the plant, foliage displacement mechanism 1400 can be positioned such that the channel 1450 surrounds the center of the plant. In a number of embodiments, foliage displacement mechanism 1400 can be configured, when moved toward the plant, to move the foliage upward and toward the center of the plant. For example, the curves on surface 1440 can be configured to lift the foliage upwards and towards the center of the plant, which can advantageously prevent damaging and/or tangling the foliage (such as the leaves, vines, and/or blossoms) of the plant.

Turning ahead in the drawings, FIG. 15 illustrates a right side view of harvesting robot 100 and foliage displacement mechanism 1400 hovering above a plant 1510 and growing bed 1501, with foliage displacement mechanism 1400 in a retracted position. To assist with water run-off, growing bed 1501 can be slightly angled. In other examples, growing bed can be flat. Plant 1510 can be a strawberry plant, as shown in FIG. 15. In other examples, plant 1510 can be a tomato plant, a pepper (e.g., bell peppers, chili peppers, etc.) plant, an orange tree, or another suitable plant. As shown in FIG. 15, plant 1510 can have a center 1513 (e.g., a crown of a strawberry plant), and foliage 1512, such as leaves, vines, and/or blossoms, that grow above growing bed 1501. Plant 1510 can have crops 1511 that, when ripe, are located on growing bed 1501. At least some of crops 1511 can be covered by foliage 1512.

In many embodiments, such as shown in FIG. 15, harvesting robot 100 can be mounted and/or supported such that central axis 311 of picking apparatus 110 is parallel to growing bed 1501. In several embodiments, foliage displacement mechanism 1400 can be attached to carrier mechanism 170 at attachment portion 1282 and/or attachment portion 1383 (FIG. 13) on 1281 with one or more attachment poles, such as attachment pole 1520. Carrier mechanism 170 can adjust foliage displacement mechanism 1400 from a retracted position, as shown in FIG. 15, toward plant 1510 to move foliage 1512 upward and toward center 1513 of plant 1510 to expose crops 1511 to be detected by image sensor 1290 and/or image sensor 1291 (FIGS. 12-13) and/or picked by harvesting robot 100. In many embodiments, center 1513 can fit within channel 1450 (FIG. 14) when foliage displacement mechanism 1400 is moved toward plant 1510.

In several embodiments, mounting bearing 1274 can be centered above plant 1510. When mounting bearing 1274 is centered above plant 1510, mounting bearing 1274 can be configured to rotate harvesting robot 100, carrier assembly 170, carriage assembly 140, picking apparatus 110, and/or foliage displacement mechanism 1400 around plant 1510. When a crop, such as one of crops 1511, is located to be picked, (a) mounting bearing 1274 can rotate carrier assembly 170 such that the gripper (e.g., 312-315 (FIG. 3)) in picking position 966 (FIGS. 9-11) is radially in a line extending from center 1513 of plant 1510 through the crop (e.g., 1511) to be picked, (b) carrier assembly 170 can move carriage assembly 140 radially inward toward plant 1510, and (c) carriage assembly 140 can lower carriage 650 (FIGS. 6, 8) to lower picking apparatus 110 to allow a gripper (e.g., 312-315 (FIG. 3)) to close and pick the crop (e.g., 1511). In some embodiments, the motion of harvesting robot 100 can beneficially conserve motion, and/or can do a minimum amount of movement, such as to harvest an average maximum number of crops (e.g., 1511) from plant 1510 in one rotation. For example, in some embodiments, harvesting robot 100 can be configured to harvest three crops from plant 1510. In other embodiments, harvesting robot 100 can be configured to harvest fewer or additional crops from plant 1510. In a number of embodiments, the picked crops can be deposited in a collection device as harvesting robot 100 moves to another plant.

Figure 16:
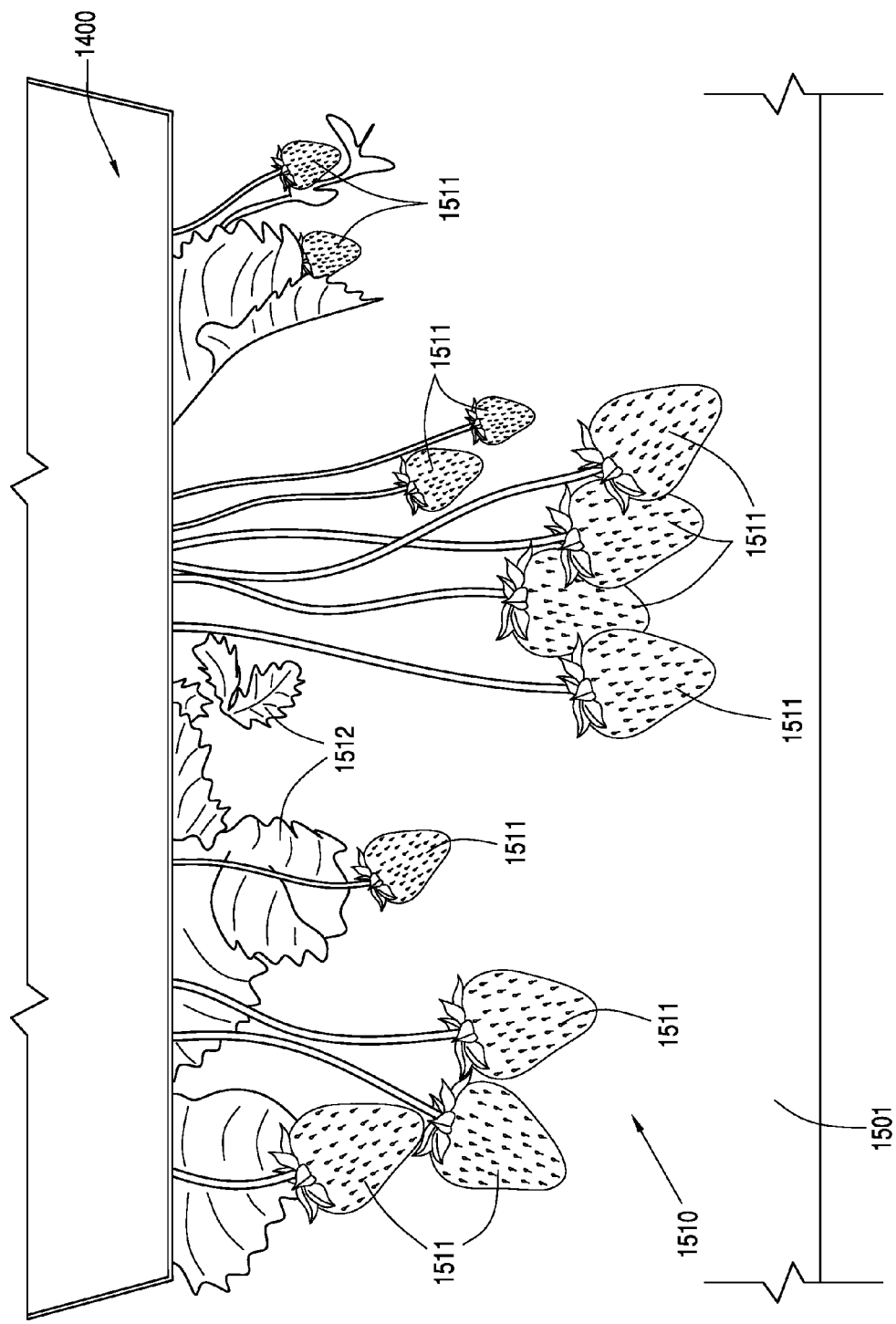
FIG. 16 illustrates a top, rear view of the foliage displacement mechanism of FIG. 14 hovering above the plant of FIG. 15 in an extended position.

Turning ahead in the drawings, FIG. 16 illustrates a top, rear view of foliage displacement mechanism 1400 hovering above plant 1510 in an extended position. In many embodiments, when foliage displacement mechanism 1400 is extended toward plant 1510, moving foliage 1512 (FIG. 15), image sensors 1290 and/or 1291 (FIGS. 12-13) can detect crops 1511 on growing bed 1501, and processing unit 1273 (FIGS. 12-13) can determine the crops to be harvested, such as based on ripeness. In many embodiments, harvesting robot 100 (FIGS. 1-2, 13, 15) can rotate around plant 1510 with foliage displacement mechanism 1400 in the extended position, as shown in FIG. 16, in order for processing unit 1273 (FIGS. 12-13) to determine which of the crops (e.g., 1511) are the best crops to be picked.

Figure 17:
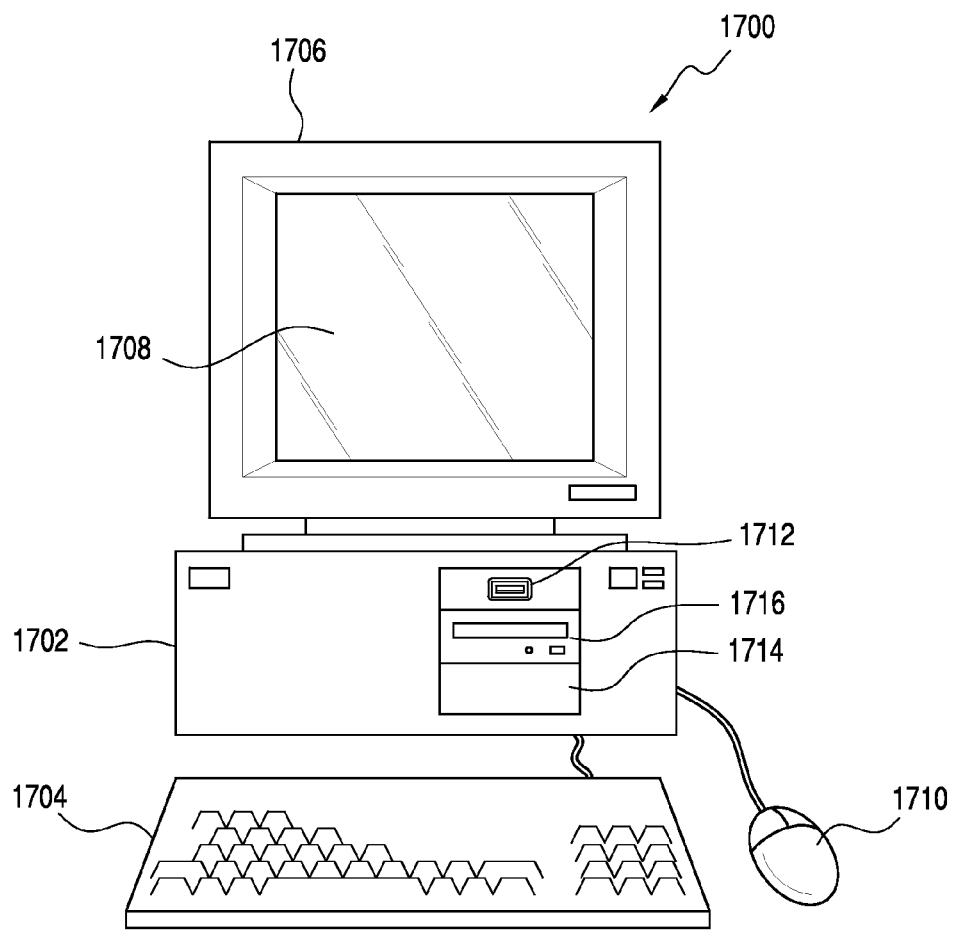
FIG. 17 illustrates a front view of a computer system that is suitable for implementing various embodiments for implementing a processing unit, according to an embodiment of the carrier assembly of FIG. 12.
Figure 18:
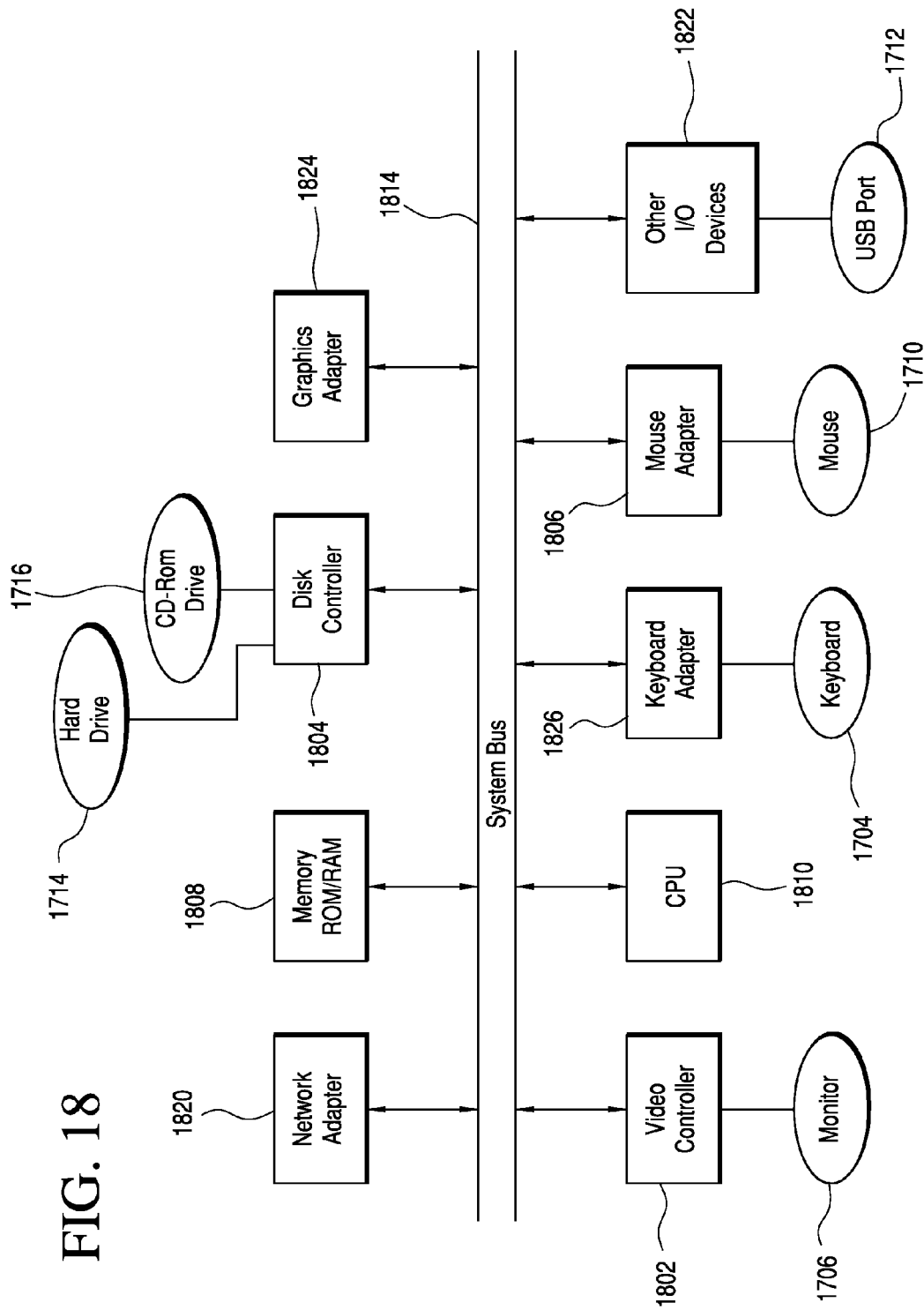
FIG. 18 illustrates a representative block diagram of an example of the elements included in the circuit boards inside a chassis of the computer system of FIG. 17.

Turning ahead in the drawings, FIG. 17 illustrates an exemplary embodiment of computer system 1700, all of which or a portion of which can be suitable for implementing processing unit 1273 (FIGS. 12-13). As an example, a different or separate one of chassis 1702 (and all or a portion of its internal components) can be suitable for implementing processing unit 1273 (FIGS. 12-13). Furthermore, one or more elements of computer system 1700 (e.g., refreshing monitor 1706, keyboard 1704, and/or mouse 1710, etc.) can also be appropriate for implementing the techniques described herein. Computer system 1700 comprises chassis 1702 containing one or more circuit boards (not shown), Universal Serial Bus (USB) port 1712, Compact Disc Read-Only Memory (CD-ROM) and/or Digital Video Disc (DVD) drive 1716, and hard drive 1714. A representative block diagram of the elements included on the circuit boards inside chassis 1702 is shown in FIG. 18. Central processing unit (CPU) 1810 in FIG. 18 is coupled to system bus 1814 in FIG. 18. In various embodiments, the architecture of CPU 1810 can be compliant with any of a variety of commercially distributed architecture families.

Continuing with FIG. 18, system bus 1814 also is coupled to memory storage unit 1808, where memory storage unit 1808 comprises both read only memory (ROM) and random access memory (RAM). Non-volatile portions of memory storage unit 1808 or the ROM can be encoded with a boot code sequence suitable for restoring computer system 1700 (FIG. 17) to a functional state after a system reset. In addition, memory storage unit 1808 can comprise microcode such as a Basic Input-Output System (BIOS). In some examples, the one or more memory storage units of the various embodiments disclosed herein can comprise memory storage unit 1808, a USB-equipped electronic device, such as, an external memory storage unit (not shown) coupled to universal serial bus (USB) port 1712 (FIGS. 17-18), hard drive 1714 (FIGS. 17-18), and/or CD-ROM or DVD drive 1716 (FIGS. 17-18). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1810.

In the depicted embodiment of FIG. 18, various I/O devices such as disk controller 1804, graphics adapter 1824, video controller 1802, keyboard adapter 1826, mouse adapter 1806, network adapter 1820, and other I/O devices 1822 can be coupled to system bus 1814. Keyboard adapter 1826 and mouse adapter 1806 are coupled to keyboard 1704 (FIGS. 17-18) and mouse 1710 (FIGS. 17-18), respectively, of computer system 1700 (FIG. 17). While graphics adapter 1824 and video controller 1802 are indicated as distinct units in FIG. 18, video controller 1802 can be integrated into graphics adapter 1824, or vice versa in other embodiments. Video controller 1802 is suitable for refreshing monitor 1706 (FIGS. 17-18) to display images on a screen 1708 (FIG. 17) of computer system 1700 (FIG. 17). Disk controller 1804 can control hard drive 1714 (FIGS. 17-18), USB port 1712 (FIGS. 17-18), and CD-ROM drive 1716 (FIGS. 17-18). In other embodiments, distinct units can be used to control each of these devices separately.

In some embodiments, network adapter 1820 can comprise and/or be implemented as a WNIC (wireless network interface controller) card (not shown) plugged or coupled to an expansion port (not shown) in computer system 1700 (FIG. 17). In other embodiments, the WNIC card can be a wireless network card built into computer system 1700 (FIG. 17). A wireless network adapter can be built into computer system 1700 by having wireless communication capabilities integrated into the motherboard chipset (not shown), or implemented via one or more dedicated wireless communication chips (not shown), connected through a PCI (peripheral component interconnector) or a PCI express bus of computer system 1700 (FIG. 17) or USB port 1712 (FIG. 17). In other embodiments, network adapter 1820 can comprise and/or be implemented as a wired network interface controller card (not shown).

Although many other components of computer system 1700 (FIG. 17) are not shown, such components and their interconnection are well known to those of ordinary skill in the art. Accordingly, further details concerning the construction and composition of computer system 1700 and the circuit boards inside chassis 1702 (FIG. 17) are not discussed herein.

When computer system 1700 in FIG. 17 is running, program instructions stored on a USB-equipped electronic device connected to USB port 1712, on a CD-ROM or DVD in CD-ROM and/or DVD drive 1716, on hard drive 1714, or in memory storage unit 1808 (FIG. 18) are executed by CPU 1810 (FIG. 18). A portion of the program instructions, stored on these devices, can be suitable for carrying out at least part of the techniques described above.

Although computer system 1700 is illustrated as a desktop computer in FIG. 17, there can be examples where computer system 1700 may take a different form factor while still having functional elements similar to those described for computer system 1700. In some embodiments, computer system 1700 may comprise a single computer, a single server, or a cluster or collection of computers or servers, or a cloud of computers or servers. Typically, a cluster or collection of servers can be used when the demand on computer system 1700 exceeds the reasonable capability of a single server or computer. In certain embodiments, computer system 1700 may comprise a portable computer, such as a laptop computer. In certain other embodiments, computer system 1700 may comprise a mobile device, such as a smart phone. In certain additional embodiments, computer system 1700 may comprise an embedded system.

Figure 19:
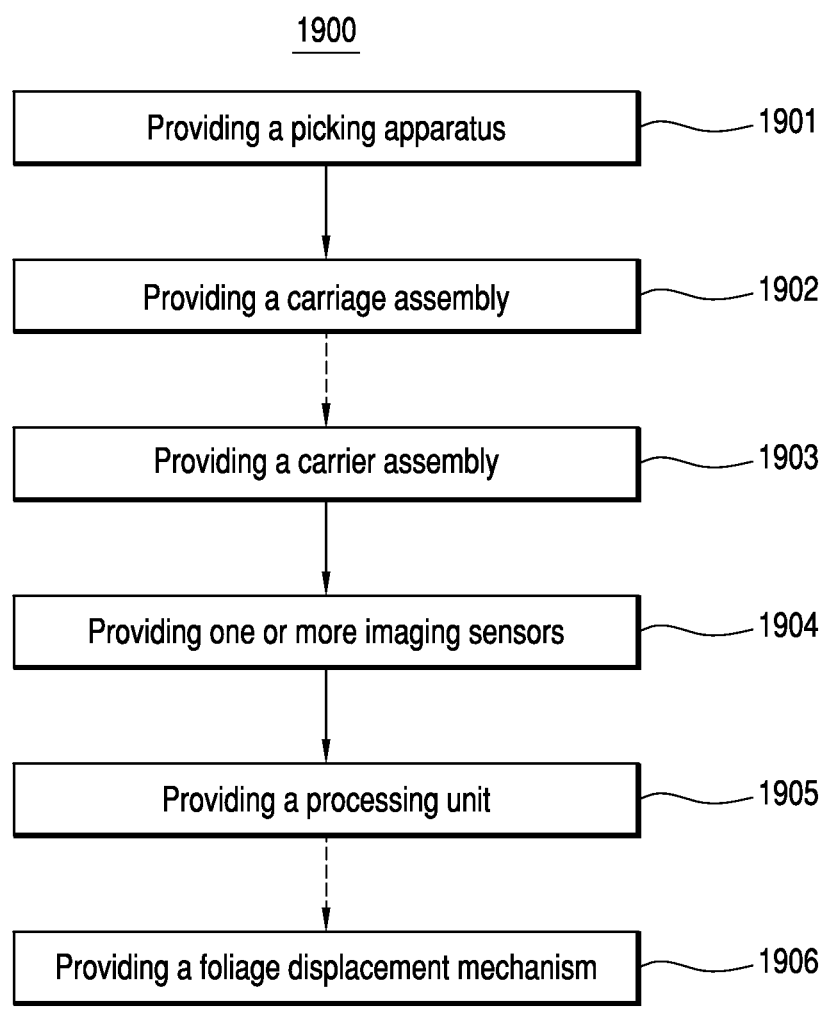
FIG. 19 illustrates a flow chart for a method of providing a device for selectively harvesting crops on a plant, according to another embodiment.

Turning ahead in the drawings, FIG. 19 illustrates a flow chart for a method 1900 of providing a device for selectively harvesting crops on a plant in accordance with the present disclosure. Method 1900 is merely exemplary and is not limited to the embodiments presented herein. Method 1900 can be employed in many different embodiments or examples not specifically depicted or described herein. In some embodiments, the procedures, the processes, and/or the activities of method 1900 can be performed in the order presented. In other embodiments, the procedures, the processes, and/or the activities of method 1900 can be performed in any suitable order. In still other embodiments, one or more of the procedures, the processes, and/or the activities of method 1900 can be combined or skipped. In some embodiments, the plant can be a strawberry plant and each of the crops can be a strawberry. The plant can be similar or identical to plant 1510 (FIG. 15). Each of the crops can be similar or identical to strawberry 535 (FIG. 5). In other embodiments, the plant can be another suitable plant.

Referring to FIG. 19, method 1900 can include a block 1901 of providing a picking apparatus. In many embodiments, the picking apparatus can be similar or identical to picking apparatus 110 (FIGS. 1-3). In a number of embodiments, the picking apparatus can be rotatable around a central axis. The central axis can be similar or identical to central axis 311 (FIG. 3). In various embodiments, the central axis can be parallel to a growing bed of the plant. The growing bed can be similar or identical to growing bed 1501 (FIG. 15). In several embodiments, the picking apparatus can include a plurality of grippers each spaced apart and extending radially from the central axis, and each configured to pick a different individual one of the crops. The individual crop can be similar or identical to crop 535, or another suitable crop. The grippers can be similar or identical to grippers 312-315 (FIG. 3). In some embodiments, the plurality of grippers can include four grippers. For example, the picking apparatus can include, four, fix, six, seven, eight, or more grippers. In other embodiments, the plurality of grippers can include fewer than four grippers.

In a number of embodiments, each of the plurality of grippers can be adjustable between an open position and a closed position. The open position can be similar or identical to the open position shown in FIG. 4. The close position can be similar or identical to the closed position shown in FIG. 5. In various embodiments, each of the plurality of grippers can be configured in the open position to open around the individual crop. In several embodiments, each of the plurality of grippers can be configured in the closed position to securely hold the individual crop when the picking apparatus is rotated around the central axis.

In some embodiments, each of the plurality of grippers can be configured to securely hold the individual crop in the closed position across different sizes of the individual crop. In many embodiments, each of the plurality of grippers can include a first claw piece and a second claw piece. The first claw piece can be similar or identical to first claw piece 410 (FIGS. 4-5). The second claw piece can be similar or identical to second claw piece 420 (FIGS. 4-5). In many embodiments, the first claw piece and/or the second claw piece can each include a metal frame at least partially covered with silicone rubber.

In a number of embodiments, for each of the plurality of grippers, the first claw piece can include a first wedged-shaped tip and/or the second claw piece can include a second wedge-shaped tip. The first wedge-shaped tip can be similar or identical to first tip 413 (FIGS. 4-5), and/or the second wedge-shaped tip can be similar or identical to second tip 423 (FIGS. 4-5). In a number of embodiments, when each of the plurality of grippers is in the open position (such as shown in FIG. 4), the first wedged-shaped tip and the second wedge-shaped tip are adjustable to fit around the individual crop and to separate the individual crop from one or more proximate crops.

In various embodiments, each of the plurality of grippers can further include a first flexible strip attached to the first claw piece and/or a second flexible strip attached to the second claw piece. The first flexible strip can be similar or identical to first strip 414 (FIGS. 4-5), and/or the second flexible strip can be similar or identical to second strip 424 (FIGS. 4-5). In several embodiments, when the gripper is adjusted to the closed position around the individual crop, the first flexible strip and the second flexible strip can be configured to bend to allow for different sizes of the individual crop.

Method 1900 next can include a block 1902 of providing a carriage assembly. In a number of embodiments, the carriage assembly can be similar or identical to carriage assembly 140 (FIGS. 1-2, 6-8). In some embodiments, the carriage assembly can include a first rotational mechanism. In many embodiments, the first rotational mechanism can be similar or identical to rotational shaft 655 (FIGS. 6-7), motor 654 (FIGS. 6-8), gear 854 (FIG. 8), and/or gear 855 (FIG. 8). In several embodiments, the picking apparatus can be configured to be coupled to the first rotational mechanism. In some embodiments, the first rotational mechanism can be configured to rotate the picking apparatus around the central axis in a rotational path with respect to the carriage assembly.

In some embodiments, the carriage assembly can further include a first cam surrounding the first rotational mechanism. The first cam can be similar or identical to stationary cam 669 (FIGS. 6, 8-11). In a number of embodiments, the carriage assembly can further include an actuator. The actuator can be similar or identical to actuator 661 (FIGS. 6-11), motor 653 (FIGS. 6-8), and/or actuation cam 660 (FIGS. 6-7, 9-11). In some embodiments, the first cam can be configured to hold the plurality of grippers in the closed position for a first portion of the rotational path and to allow the plurality of grippers to open to the open position for a second portion of the rotational path from a release position to a picking position. The first portion of the rotational path can be similar or identical to first portion 964 (FIGS. 9-11), and/or the second portion of the rotational path can be similar or identical to second portion 965 (FIGS. 9-11). The release position can be similar or identical to release position 967 (FIGS. 9-11), and/or the picking position can be similar or identical to picking position 966 (FIGS. 9-11). In a number of embodiments, the first cam can be configured to stop rotation of the picking apparatus when each of the plurality of grippers is rotated to the picking position on the second portion of the rotational path. In various embodiments, the actuator can be configured to adjust an opening width of a picking gripper of the plurality of grippers at the picking position to isolate the individual crop and to close the gripper to securely hold the individual crop. The picking gripper can be similar or identical to gripper 312 at picking position 966 as shown in FIGS. 10-11. The first cam can be configured such that, as each of the plurality of grippers rotates to the release position of the rotational path, each of the plurality of grippers can be configured to open to the open position and release the individual crop in a collection device.

Method 1900 next can optionally include a block 1903 of providing a carrier assembly. The carrier assembly can be similar or identical to carrier assembly 170 (FIGS. 1-2, 12-13). In some embodiments, the carrier assembly can include a second rotational mechanism. The second rotational mechanism can be similar or identical to mounting bearing 1274 (FIGS. 12-13). In various embodiments, the second rotational mechanism can be configured to rotate the carrier assembly around the second rotational mechanism such that the picking apparatus can be rotated around the plant when the second rotational mechanism is centered above the plant.

Method 1900 next can include a block 1904 of providing one or more imaging sensors. In a number of embodiments, the one or more imaging sensors can be similar or identical to imaging sensor 1290 (FIGS. 12-13) and/or imaging sensor 1291 (FIGS. 12-13).

Method 1900 next can include a block 1905 of providing a processing unit. The processing unit can be similar or identical to processing unit 1273 (FIGS. 12-13). In a number of embodiments, the processing unit can be configured to receive information from the one or more imaging sensors to determine the location of the crops to be harvested.

Method 1900 next can optionally include a block 1906 of providing a foliage displacement mechanism. In many embodiments, the foliage displacement mechanism can be similar or identical to foliage displacement mechanism 1400 (FIGS. 14-16). In several embodiments, the foliage displacement mechanism can be configured to move foliage of the plant and expose at least a portion of the crops to the one or more image sensors. The foliage can be similar or identical to foliage 1512 (FIG. 15). In some embodiments, the foliage displacement mechanism can include a back surface. The back surface can be similar or identical to back surface 1410 (FIG. 14). In many embodiments, the back surface can be configured to extend normal to a growing bed of the plant. In various embodiments, the foliage displacement mechanism can include a base. The base can be similar or identical to base 1420 (FIG. 14). In several embodiments, the base can be configured to extend parallel to the growing bed from the back surface toward the plant. In some embodiments, the foliage displacement mechanism can include a curved surface. The curved surface can be similar or identical to surface 1440 (FIG. 14). In a number of embodiments, the curved surface can extend from the base upward to the back surface. In many embodiments, the foliage displacement mechanism can include a channel. The channel can be similar or identical to channel 1450 (FIG. 14). In some embodiments, the channel can bisect a front portion of the base and extend upward through the curved surface. In several embodiments, the channel can be configured to surround a center of the plant when the foliage displacement mechanism is moved toward the plant. The center of the plant can be similar or identical to center 1513. In some embodiments, the foliage displacement mechanism can be configured, when moved toward the plant, to move the foliage upward and toward the center of the plant.

Although automated selective harvesting of crops has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-19 may be modified, and that the foregoing discussion of certain of these embodiments does not necessarily represent a complete description of all possible embodiments. For example, one or more of the procedures, processes, or activities of FIG. 19 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A device for selectively harvesting crops on a plant, the device comprising:
   a picking apparatus, the picking apparatus being rotatable around a central axis, the picking apparatus comprising:
      a plurality of grippers each spaced apart and extending radially from the central axis, and each configured to pick a different individual one of the crops;
   a carriage assembly comprising a first rotational mechanism; and a carrier assembly comprising a second rotational mechanism,
wherein:
  each of the plurality of grippers are adjustable between an open position and a closed position;
  each of the plurality of grippers are configured in the open position to open around the individual crop;
  each of the plurality of grippers are configured in the closed position to securely hold the individual crop when the picking apparatus is rotated around the central axis;
  the picking apparatus is configured to be coupled to the first rotational mechanism;
  the first rotational mechanism is configured to rotate the picking apparatus around the central axis in a rotational path with respect to the carriage assembly;
  the carriage assembly is coupled to the carrier assembly; and
  the second rotational mechanism is configured to rotate the carrier assembly around the second rotational mechanism such that the picking apparatus is rotated around the plant when the second rotational mechanism is centered above the plant.

2. The device of claim 1, wherein:
the plurality of grippers comprises four grippers.

3. The device of claim 1, wherein:
the plant is a strawberry plant; and
each of the crops is a strawberry.

4. The device of claim 1, wherein:
each of the plurality of grippers are configured to securely hold the individual crop in the closed position across different sizes of the individual crop.

5. The device of claim 1, wherein:
each of the plurality of grippers comprises a first claw piece and a second claw piece.

6. The device of claim 5, wherein,
for each of the plurality of grippers:
  the first claw piece comprises a first wedged-shaped tip;
  the second claw piece comprises a second wedge-shaped tip; and
when each of the plurality of grippers is in the open position, the first wedged-shaped tip and the second wedge-shaped tip are adjustable to fit around the individual crop and to separate the individual crop from one or more proximate crops.

7. The device of claim 5, wherein:
each of the plurality of grippers further comprises:
  a first flexible strip attached to the first claw piece; and
  a second flexible strip attached to the second claw piece; and
when each of the plurality of grippers is adjusted to the closed position around the individual crop, the first flexible strip and the second flexible strip are configured to bend to allow for different sizes of the individual crop.

8. The device of claim 5, wherein:
the first claw piece and the second claw piece each comprise a metal frame at least partially covered with silicone rubber.

9. The device of claim 1 further comprising:
one or more imaging sensors; and
a processing unit,
wherein:
  the processing unit is configured to receive information from the one or more imaging sensors to determine a location of the crops to be harvested.

10. The device of claim 9 further comprising:
a foliage displacement mechanism configured to move foliage of the plant and expose at least a portion of the crops to the one or more imaging sensors.

11. The device of claim 10, wherein:
the foliage displacement mechanism comprises:
  a back surface configured to extend normal to a growing bed of the plant;
  a base configured to extend parallel to the growing bed from the back surface toward the plant;
  a curved surface extending from the base upward to the back surface; and
  a channel bisecting a front portion of the base and extending upward through the curved surface, the channel being configured to surround a center of the plant when the foliage displacement mechanism is moved toward the plant,
wherein:
  the foliage displacement mechanism is configured, when moved toward the plant, to move the foliage upward and toward the center of the plant.

12. The device of claim 1, wherein:
the carriage assembly further comprising:
  a first cam surrounding the first rotational mechanism; and
  an actuator; and
the central axis is parallel to a growing bed of the plant;
the first cam is configured to hold the plurality of grippers in the closed position for a first portion of the rotational path and to allow the plurality of grippers to open to the open position for a second portion of the rotational path from a release position to a picking position;
the first cam is configured to stop rotation of the picking apparatus when each of the plurality of grippers is rotated to the picking position on the second portion of the rotational path;
the actuator is configured to adjust an opening width of a picking gripper of the plurality of grippers at the picking position to isolate the individual crop and to close the picking gripper to securely hold the individual crop; and
the first cam is configured such that, as each of the plurality of grippers rotates to the release position of the rotational path, each of the plurality of grippers is configured to open to the open position and release the individual crop in a collection device.

13. The device of claim 1, wherein:
when the second rotational mechanism is centered above the plant and one of the plurality of grippers is in the open position, the device is configured to lower the one of the plurality of grippers to a growing bed of the plant to pick the individual crop.

14. A method of providing a device for selectively harvesting crops on a plant, the method comprising:
providing a picking apparatus, the picking apparatus being rotatable around a central axis, the picking apparatus comprising a plurality of grippers each spaced apart and extending radially from the central axis, and each configured to pick a different individual one of the crops;
providing a carriage assembly comprising a first rotational mechanism; and
providing a carrier assembly comprising a second rotational mechanism,
wherein:
  the picking apparatus is configured to be coupled to the first rotational mechanism;

the first rotational mechanism is configured to rotate the picking apparatus around the central axis in a rotational path with respect to the carriage assembly;

each of the plurality of grippers are adjustable between an open position and a closed position;

each of the plurality of grippers are configured in the open position to open around the individual crop;

each of the plurality of grippers are configured in the closed position to securely hold the individual crop when the picking apparatus is rotated around the central axis;

the carriage assembly is coupled to the carrier assembly; and the second rotational mechanism is configured to rotate the carrier assembly around the second rotational mechanism such that the picking apparatus is rotated around the plant when the second rotational mechanism is centered above the plant.

15. The method of claim 14, wherein:
the plurality of grippers comprises four grippers.

16. The method of claim 14, wherein:
the plant is a strawberry plant; and
each of the crops is a strawberry.

17. The method of claim 14, wherein:
each of the plurality of grippers are configured to securely hold the individual crop in the closed position across different sizes of the individual crop.

18. The method of claim 14, wherein:
each of the plurality of grippers comprises a first claw piece and a second claw piece.

19. The method of claim 18, wherein:
for each of the plurality of grippers:
the first claw piece comprises a first wedged-shaped tip;
the second claw piece comprises a second wedge-shaped tip; and
when each of the plurality of grippers is in the open position, the first wedged-shaped tip and the second wedge-shaped tip are adjustable to fit around the individual crop and to separate the individual crop from one or more proximate crops.

20. The method of claim 18, wherein:
each of the plurality of grippers further comprises:
a first flexible strip attached to the first claw piece; and
a second flexible strip attached to the second claw piece; and
when each of the plurality of grippers is adjusted to the closed position around the individual crop, the first flexible strip and the second flexible strip are configured to bend to allow for different sizes of the individual crop.

21. The method of claim 18, wherein:
the first claw piece and the second claw piece each comprise a metal frame at least partially covered with silicone rubber.

22. The method of claim 14 further comprising:
providing one or more imaging sensors; and
providing a processing unit,
wherein:
the processing unit is configured to receive information from the one or more imaging sensors to determine a location of the crops to be harvested.

23. The method of claim 22 further comprising:
providing a foliage displacement mechanism configured to move foliage of the plant and expose at least a portion of the crops to the one or more imaging sensors.

24. The method of claim 23, wherein:
the foliage displacement mechanism comprises:
a back surface configured to extend normal to a growing bed of the plant;
a base configured to extend parallel to the growing bed from the back surface toward the plant;
a curved surface extending from the base upward to the back surface; and
a channel bisecting a front portion of the base and extending upward through the curved surface, the channel being configured to surround a center of the plant when the foliage displacement mechanism is moved toward the plant,
wherein:
the foliage displacement mechanism is configured, when moved toward the plant, to move the foliage upward and toward the center of the plant.

25. A method of providing a device for selectively harvesting crops on a plant, the method comprising:
providing a picking apparatus, the picking apparatus being rotatable around a central axis, the picking apparatus comprising a plurality of grippers each spaced apart and extending radially from the central axis, and each configured to pick a different individual one of the crops; and
providing a carriage assembly comprising a first rotational mechanism,
wherein:
the picking apparatus is configured to be coupled to the first rotational mechanism;
the first rotational mechanism is configured to rotate the picking apparatus around the central axis in a rotational path with respect to the carriage assembly;
each of the plurality of grippers are adjustable between an open position and a closed position;
each of the plurality of grippers are configured in the open position to open around the individual crop;
each of the plurality of grippers are configured in the closed position to securely hold the individual crop when the picking apparatus is rotated around the central axis;
the carriage assembly further comprises:
a first cam surrounding the first rotational mechanism; and
an actuator; and
the central axis is parallel to a growing bed of the plant;
the first cam is configured to hold the plurality of grippers in the closed position for a first portion of the rotational path and to allow the plurality of grippers to open to the open position for a second portion of the rotational path from a release position to a picking position;
the first cam is configured to stop rotation of the picking apparatus when each of the plurality of grippers is rotated to the picking position on the second portion of the rotational path;
the actuator is configured to adjust an opening width of a picking gripper of the plurality of grippers at the picking position to isolate the individual crop and to close the picking gripper to securely hold the individual crop; and
the first cam is configured such that, as each of the plurality of grippers rotates to the release position of the rotational path, each of the plurality of grippers is configured to open to the open position and release the individual crop in a collection device.

\* \* \* \* \*